Aug. 4, 1953  W. H. WATSON ET AL  2,647,357
RING SPINNING MACHINE FOR SPINNING FIBROUS MATERIAL
Filed Aug. 20, 1949  18 Sheets-Sheet 2

Inventors
William Harold Watson
Stanley Lewis Cole
By
Pennie, Edmonds, Morton and Barrows
Attorneys

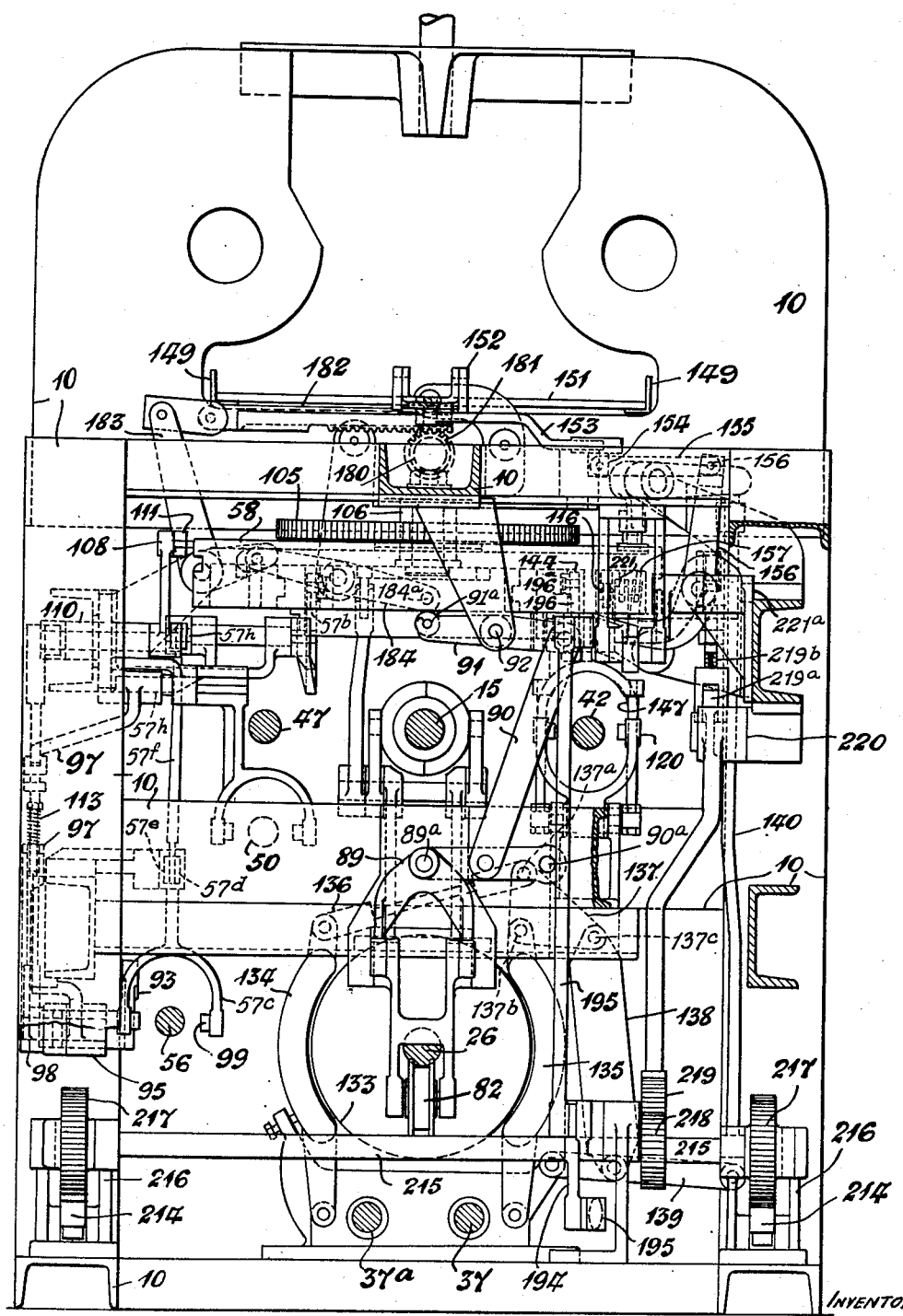
FIG. 4ª

Aug. 4, 1953   W. H. WATSON ET AL   2,647,357
RING SPINNING MACHINE FOR SPINNING FIBROUS MATERIAL
Filed Aug. 20, 1949   18 Sheets-Sheet 6

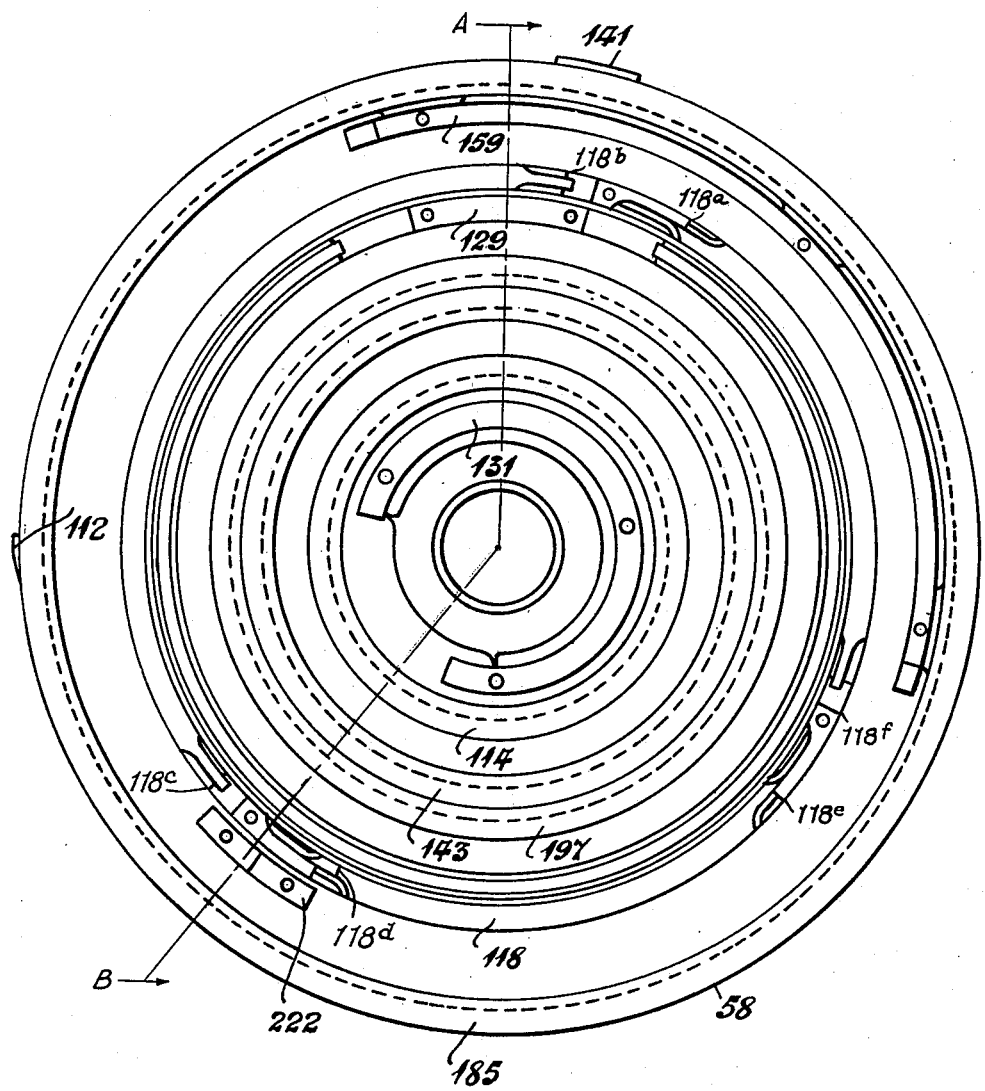
FIG. 5ᵃ

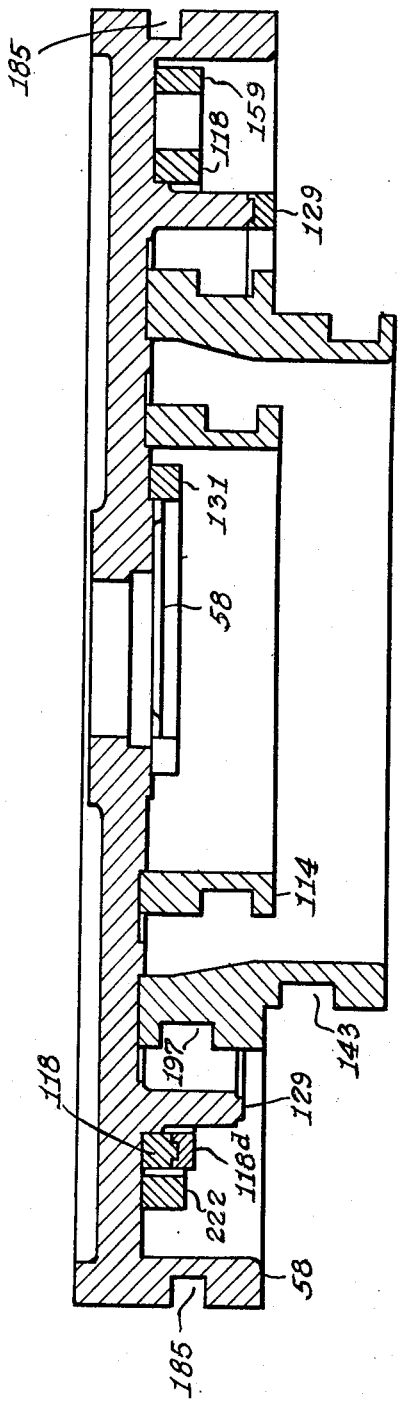

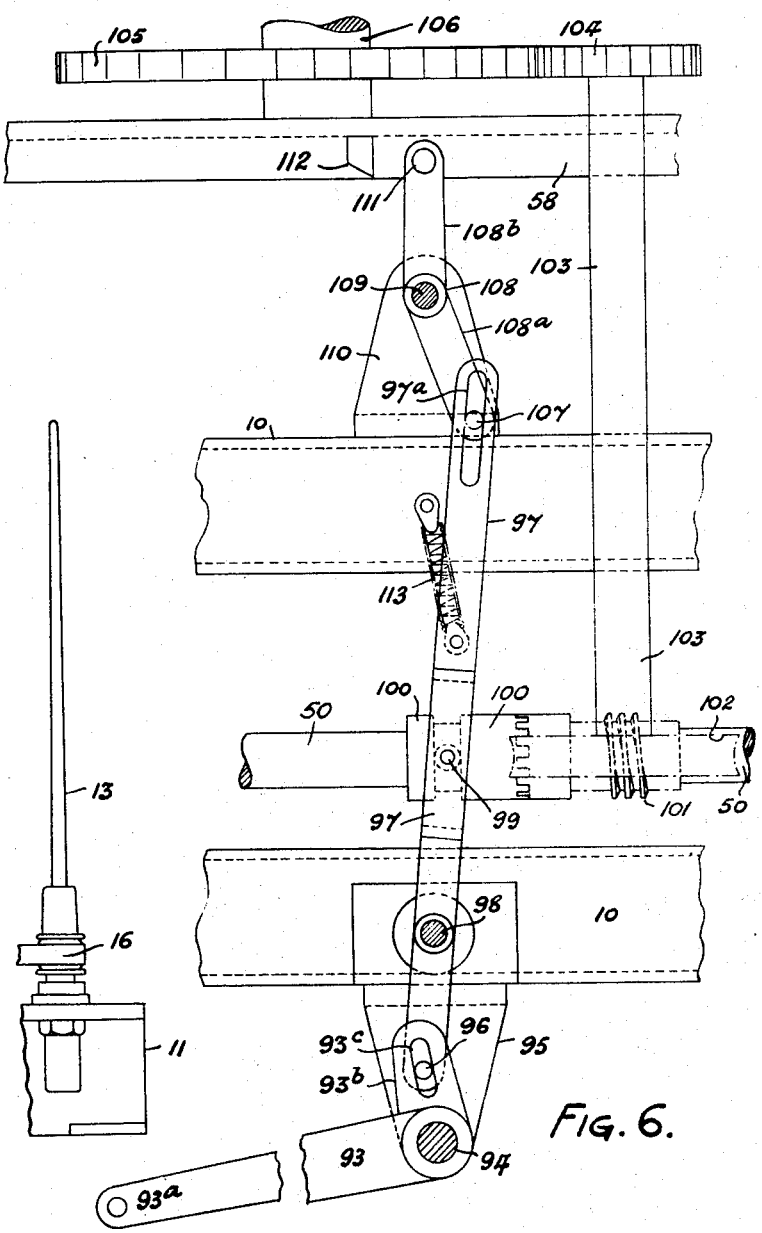

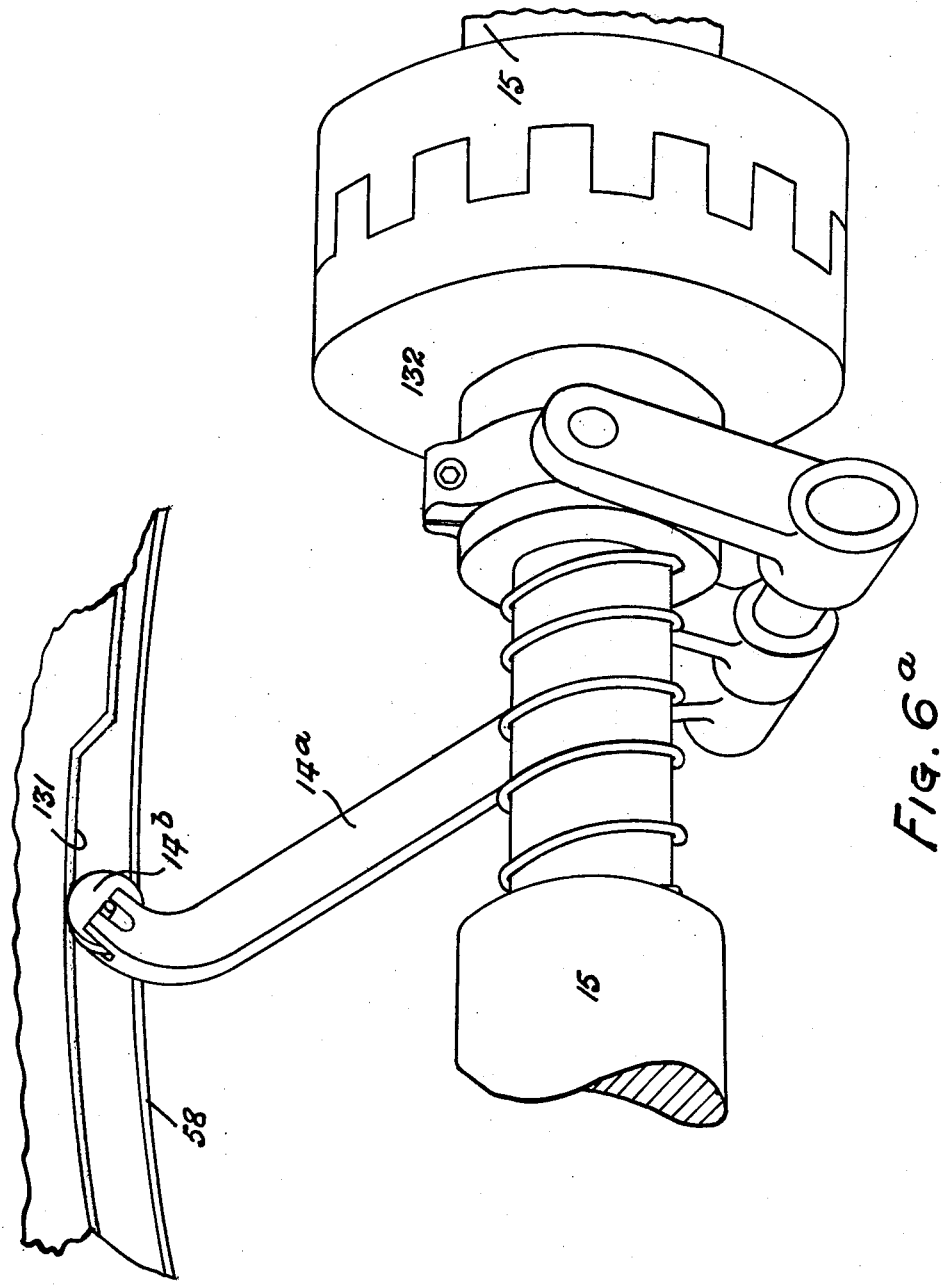

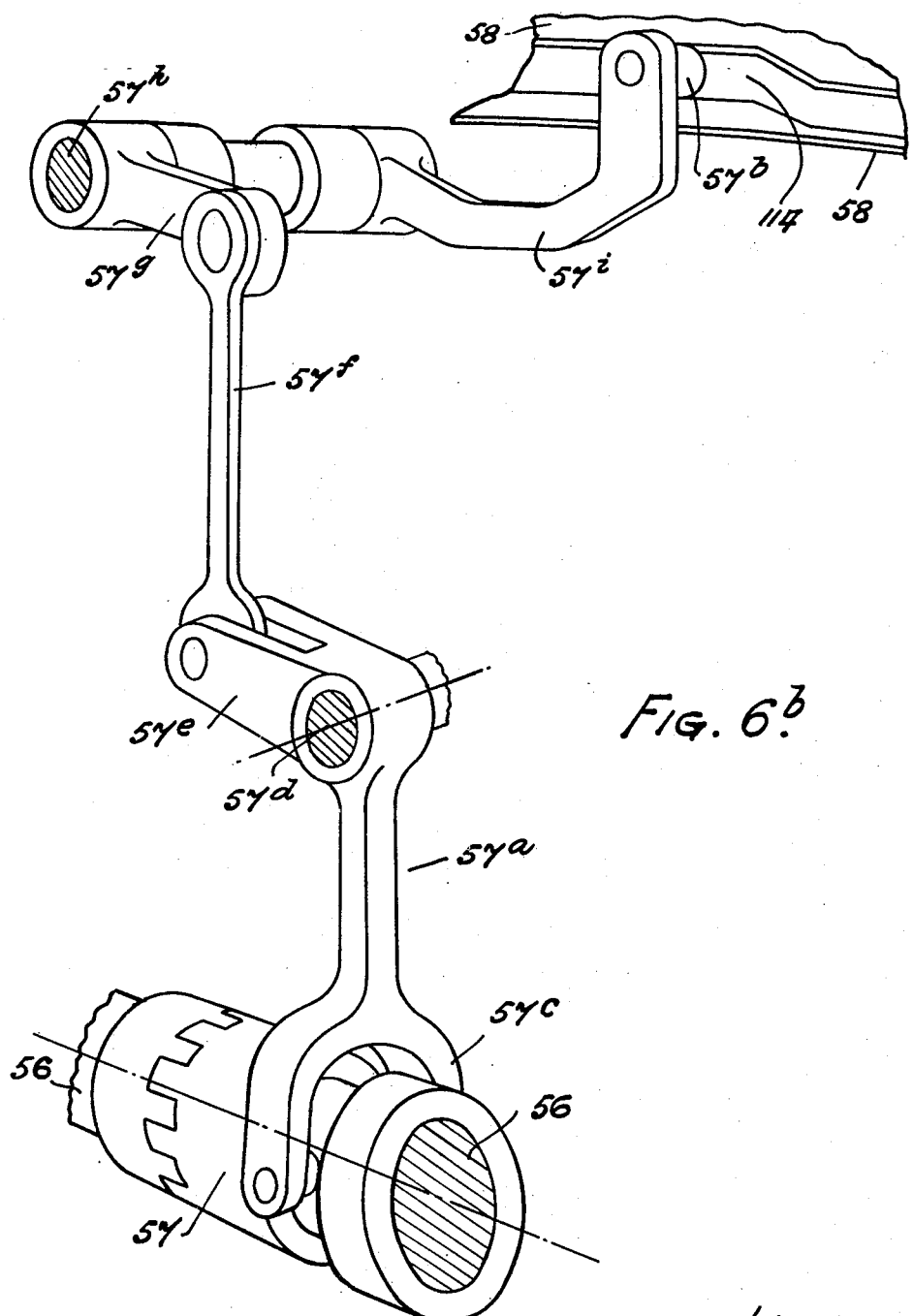

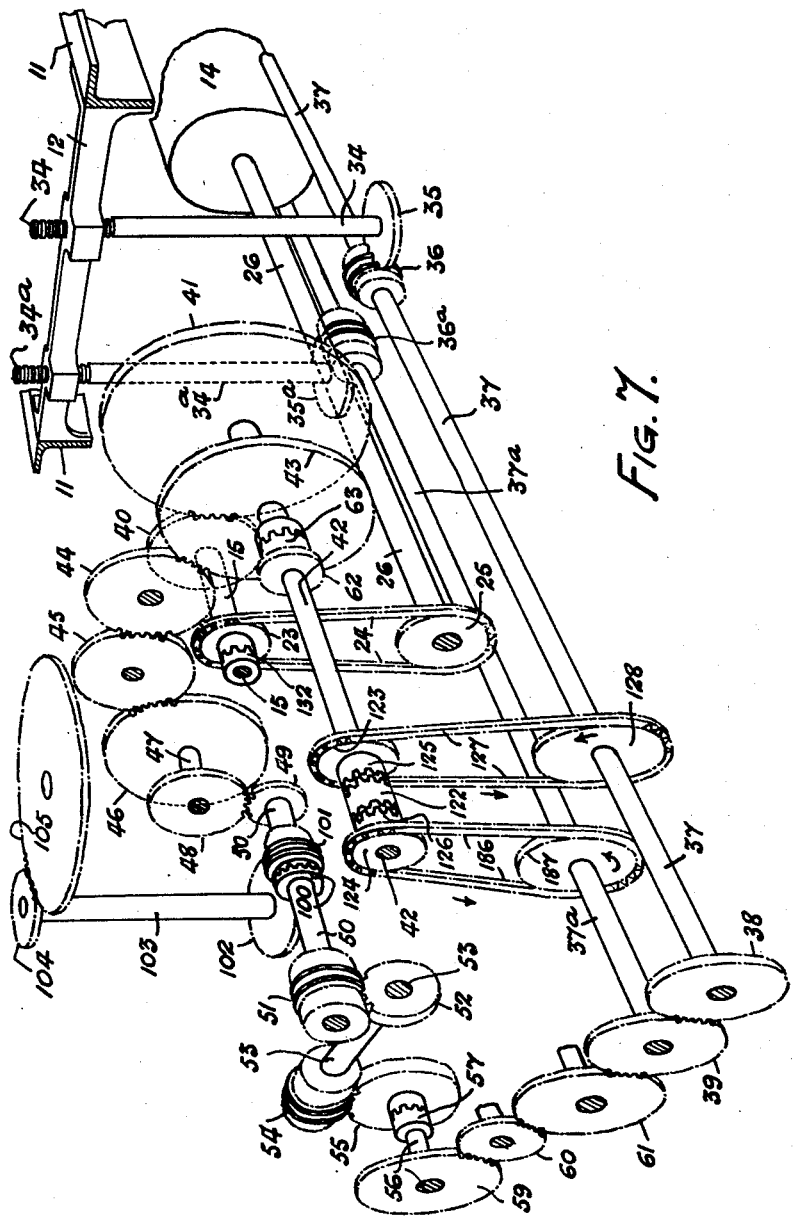

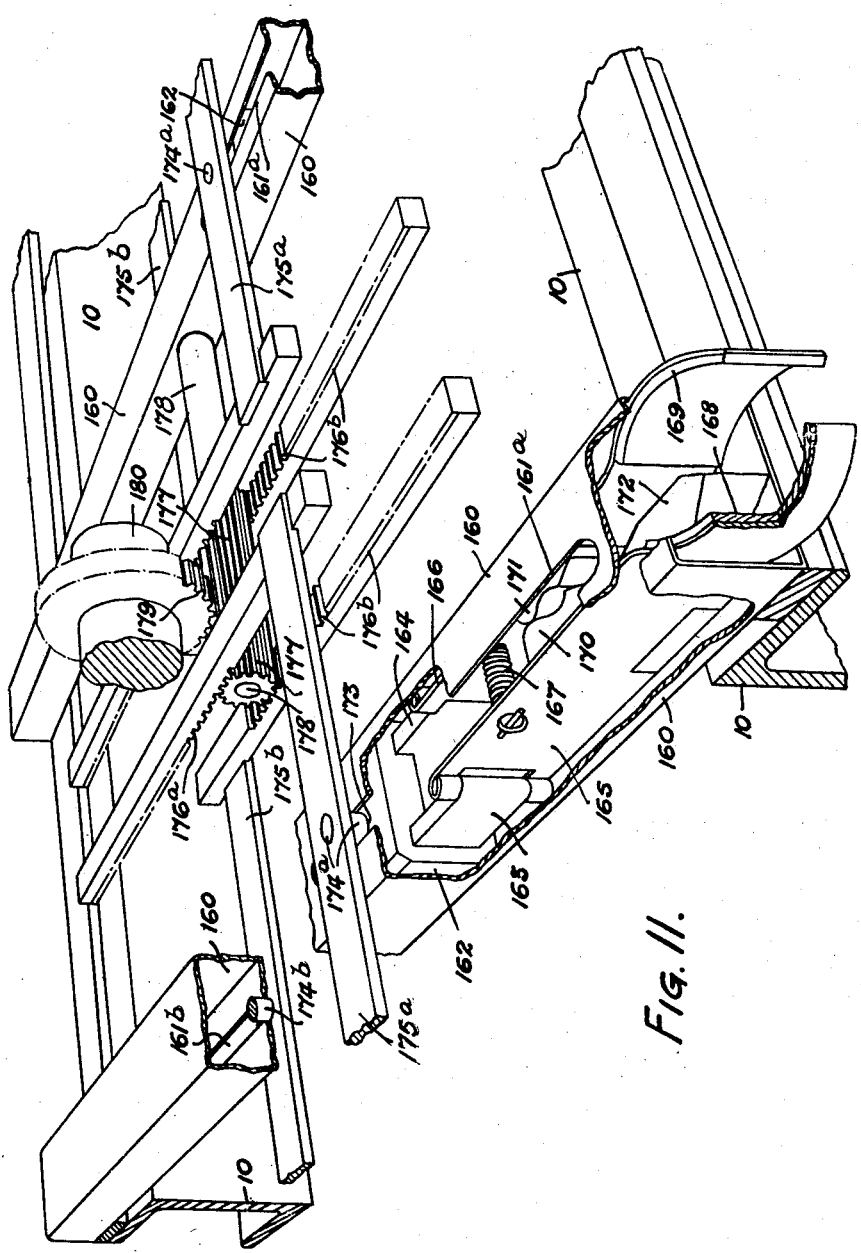

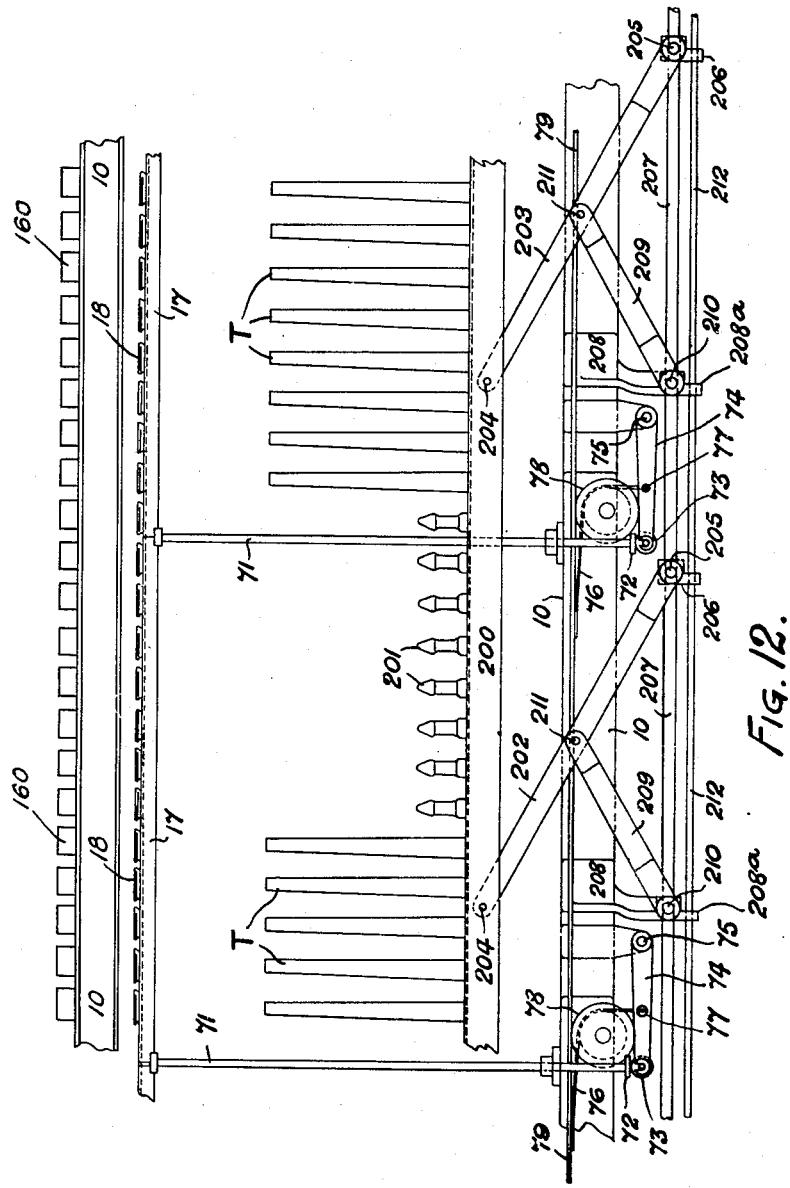

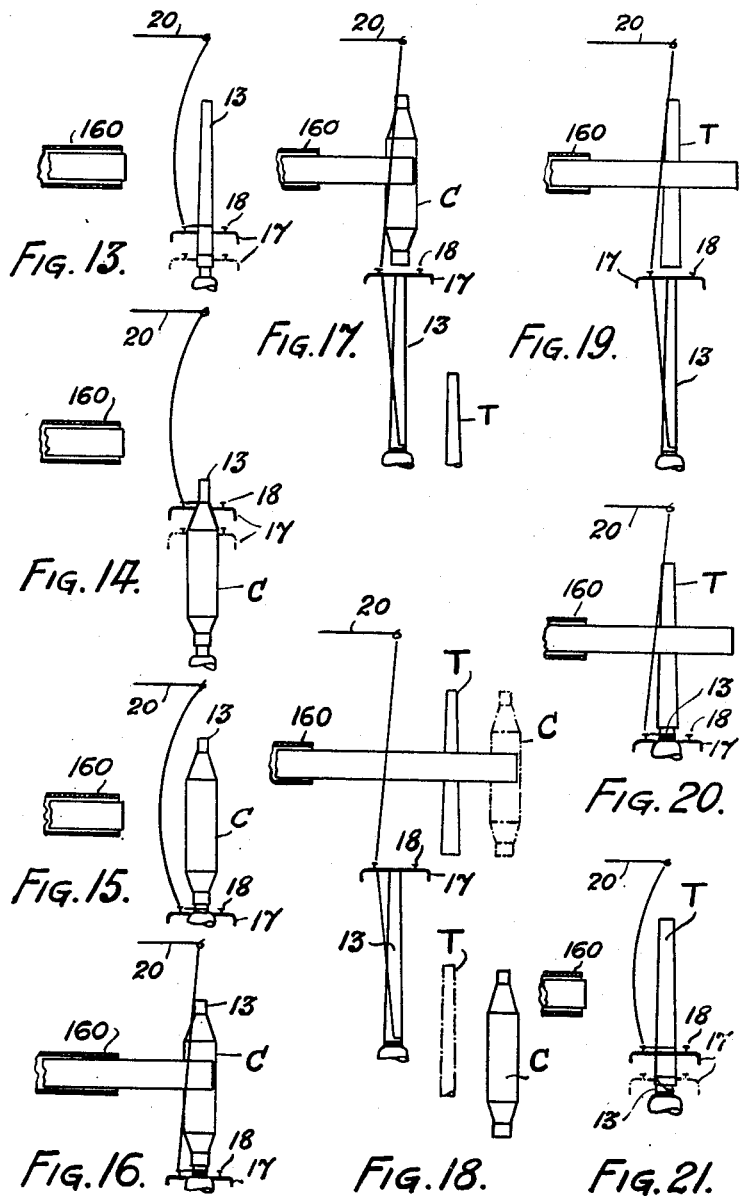

Patented Aug. 4, 1953

2,647,357

UNITED STATES PATENT OFFICE 2,647,357

RING SPINNING MACHINE FOR SPINNING FIBROUS MATERIAL

William Harold Watson, Werneth, Oldham, and Stanley Lewis Cole, Helmshore, Rossendale, England, assignors to T. M. M. (Research) Limited, Helmshore, Rossendale, England Application August 20, 1949, Serial No. 111,488
In Great Britain August 21, 1948

16 Claims. (Cl. 57—52)

This invention relates to ring-spinning machines in which are provided means for raising and lowering the ring plates vertically within short predetermined limits during the building-up of the cops, means for raising and lowering the spindle rail vertically whereby the spindle rail is caused to make a slow movement in the downward direction during the building-up of the cops, and means for driving the spindles including compensating means for permitting rise and fall of the spindles while maintaining the driving bands or tapes in uniform tension.

The object of the present invention is to provide a ring-spinning machine of the aforementioned type incorporating means for automatically removing full cops from the spindles; means for replenishing the spindles with fresh tubes; means for allowing an extra falling movement of the ring plates during the doffing cycle to permit winding of a number of turns of thread on to the spindle blade and then to return the ring plates to normal spinning position; means for giving the spindle rail a quick upward movement to a doffing position after completion of the cops and while the spindles are still revolving, a slight turning movement in the reverse direction to spinning simultaneously with a downward movement of the spindles for facilitating doffing, and a quick return vertical movement with the spindles turning in the spinning direction to initial position for replenishment of the spindles, now stationary, with fresh tubes and for subsequent restarting of a spinning operation; and means for stopping the delivery of material from the draw rollers.

The ring spinning machine also embodies certain known mechanisms which form no part of the present invention, and modifications and improvements in other known mechanisms.

In known ring-spinning machines of the type to which this invention relates the spindle rail is mounted at opposite ends on screw-threaded rods rotatably carried in bearings on the frame of the machine and adapted to be rotated by gearing, or otherwise, receiving motion through a clutch coupling from an electro-motor located at the base of the machine whereby the spindle rail is caused to travel up or down in a vertical direction as required in the working of the spinning machine, the spindle rail on the opposite side of the spinning machine moving in unison.

In ring-spinning machines of this type it is also known to mount the ring plates on pokers which are raised and lowered by levers actuated by draw-bars running the whole length of the machine. The draw-bars are connected together by a tie bracket at one end of the machine, and a chain, connected by one end to the centre of the tie bracket, wraps a pulley carried by the machine frame and is fastened at its opposite end to a swing lever. The said swing lever is actuated by a cam, and its motion is transmitted through the chain and draw-bars to the ring plates.

In these machines the spindles are driven in groups by means of an endless driving band or tape wrapping a driving pulley, hereinafter referred to as a tin roller, fast on the driving shaft of the machine and passing around the wharves on a pair of spindles on one side of the spinning machine, thence around a jockey pulley and returning around a pair of spindles on the opposite side of the machine. With this disposition of the band or tape the pairs of spindles are rotated in the same direction. The driving band or tape also wraps a further jockey pulley mounted on a stretcher bar connecting spindle rails on opposite sides of the machine and a tension pulley fixed on the frame of the machine intermediate of said jockey pulleys, whereby the driving band or tape is maintained in uniform tension during the rise and fall of the spindle rails.

For convenience in the description now to be given, by way of example, of a ring spinning machine constructed according to the invention reference will generally be made to the operative parts on one side of the spinning machine, but it is to be understood that the operative parts on the other side of the spinning machine are similar.

According to the invention a ring-spinning machine of the aforementioned type is provided which incorporates means for stopping the spinning operation when the cops are full, means for removing the full cops, means for replenishing the spindles with fresh tubes, and means for restarting the spinning operation, all of the said means being automatically actuated and controlled in a manner to be described, from a multi-track cam hereinafter referred to as the main control cam.

As the normal spinning operation is nearing completion and the spindle rail is slowly approaching its bottom position, the spindle rail actuates a clutch which serves to set the main control cam in motion. The main control cam then rotates to control the sequence of operations required automatically to doff and replenish the spindles and to restart the spinning operation, whereupon the control cam is thrown out of action until the commencement of the next doffing cycle.

Means are also provided to allow an extra falling movement of the ring plates during the doffing cycle to permit a number of turns of spun thread to be wound at the base of the spindle blades.

To obtain the required extra falling movement of the ring plates the chain pulley previously referred to is mounted in one arm of a bell-crank lever pivoted in the machine frame the other arm of said lever being connected by a link to one end of a further lever also pivoted in the machine frame and carrying at its opposite end a bowl tracking a cam surface in the main control cam, whereby at a predetermined point in the doffing cycle the chain is slackened thereby permitting extra movement of the draw-bars and so allowing the ring plates to fall below the bottom spinning position, adjustable stops being provided on the draw-bars to limit the extent of said movement. This motion is such that although for doffing the ring plate is stationary the ring plate lifter cam remains in motion.

Just prior to the completion of the doffing cycle the chain is tightened and the ring plate is returned to initial spinning position.

Located behind each spindle is an individual doffing mechanism including two sets of spring-influenced gripper jaws and adapted to be moved into operative position at the completion of the build-up of the cop, whereupon one set of jaws grip the completed cop and after removal of the cop from the spindle the doffing mechanism advances to a position where the full cop is released from said jaws by the act of insertion of a fresh tube into the second set of gripper jaws, the doffing mechanism then being partially retracted to bring the said tube above the respective spindle to receive the said tube, the doffing mechanism subsequently being returned to initial position.

There is a separate doffing mechanism for each spindle on one side of the machine and its opposite number on the other side of the spinning machine, but the doffing mechanisms for each of such pairs of spindles are operated simultaneously. Each doffing mechanism includes a rectangular tube arranged across the machine in line with the pair of spindles with which it is to operate the tube ends being behind the respective spindles.

Located slidably within the said tube are two slide blocks each having hinged thereto two arms each pair of arms extending in opposite directions towards the respective open ends of the tube. Each arm is so shaped at its distal end as to provide in conjunction with its opposite number gripping jaws furnished with rubber blocks and adapted to partially circumscribe the diameter of a full spun cop.

Immediately behind the said jaws and on the inner side of each arm are mounted fibre blocks so shaped as to form a gripper adapted to hold an empty cop tube.

The arms are normally sprung together by a tension spring positioned adjacent to the tube grippers. The assemblage of blocks and grippers are normally withdrawn into the aforesaid tube, one set to the right and the other set to the left of the tube centre. The tube is furnished at opposite ends adjacent to the respective open ends with cam blocks located between the respective pairs of gripper arms and so contrived that the gripper jaws are caused to open as the respective grippers are moved from their positions within the tube to their various positions over the lines of their own spindles.

The grippers are restored to initial closed position by means of the aforesaid spring as they are returned to normal position within the tube.

All the grippers are moved in and out simultaneously along both sides of the machine through the medium of rack-and-pinion mechanism operated from the main shaft.

Whilst the machine is spinning the operator fills the tube racks with fresh tubes.

Means are also provided for imparting a short relatively slow turning movement to the spindles in one direction, i. e., contra to the direction of spinning, to break the frictional contact between the spindle and the tube preparatory to doffing, during which movement the turns of thread previously wound on to the spindle blade are unwound to compensate for the downward movement of the spindle. When the spindle is clear of the full cop the doffing operation proceeds to completion, after which the spindle rises to receive a fresh tube and is simultaneously revolved in the opposite direction to re-wind the beforementioned portion of thread on to the spindle thereby maintaining the continuity of thread between the delivery rollers and the spindle.

Brake mechanism is also provided adapted to be brought into operation momentarily immediately the front delivery roller is declutched on completion of a full cop, whereby to stop the rotation of the tin roller so stopping turning of the spindles, the brake then being quickly released to permit the tin roller to be turned in reverse direction to impart a momentary turning movement of the spindles in the reverse direction to that of spinning in order, first, to break the frictional grip of the cop tube on the spindle blade, and then to unwind the turns of thread previously wound on the spindle to compensate for the downward movement of the spindles as previously described.

Means are provided for replenishing the spindles with new tubes after the doffing is completed, said means including light channel section beams extending along each side of the spinning machine in front of the spindles and furnished with a multiplicity of upstanding nipples each in register with an adjacent spindle and adapted to receive a tube placed thereon by the operator.

The said beams are adapted to be raised and lowered vertically by means of a lever system in operative association with rack-and-pinion mechanism operated from the main control cam plate. The beams on reaching ultimate top position force the tubes on the nipples into the tube grippers of the respective doffing mechanism, previously referred to, and in so doing cause the gripping jaws holding the full cops to release their hold of said cops which fall on to a conveyor. In the reverse movement of the beams, i. e., in a downward direction, the nipples are withdrawn from the tubes leaving the tubes in the tube gripping jaws; the doffing mechanisms are then partly retracted to bring the tubes vertically over and in register with the spindles whereupon the spindle rails are raised causing the spindles to enter the adjacent tubes, the doffer mechanism being then retracted to initial closed position leaving the tubes in proper position on the spindles.

Lappets of usual construction are provided located over each spindle and carried by slide bars one on each side of the spinning machine and extending the whole length of the machine and adapted to be moved whereby the lappets may be slid out of normal operative position during the doffing cycle to permit the gripping jaws of the doffing mechanism to take hold of a full cop on a spindle without fouling the thread, the said slide-bars being operated in timed sequence from the main control cam plate.

The main control cam plate previously referred to comprises a large disc mounted over the gearing end of the machine and furnished on its under side with a multiplicity of concentric cam tracks adapted to be tracked by cam bowls each in operative association with mechanism for effecting in timed sequence the various movements in the cycle of operations of the spinning machine. The control cam plate is driven from the main driving shaft through clutch-controlled reduction gears.

Description will now be given of the construction and operation of a ring spinning machine according to the invention, reference being made to the accompanying drawings in which the same reference characters indicate corresponding parts in the several figures of the drawings. For clarity of illustration parts of the spinning machine not directly concerned with the invention and which are of usual construction have been omitted and only sufficient of the spinning machine is shown as will enable anyone skilled in the art to understand the invention.

Referring to the drawings, Fig. 1 is a fragmentary side view, partly sectional, of a ring spinning machine according to the invention showing the gearing end of the spinning machine with certain parts omitted for clearness; Fig. 2 is an end view, partly sectional, and mainly diagrammatic, of the gearing end of the spinning machine illustrated in Fig. 1; Fig. 3 is a fragmentary perspective view, partly sectional, showing a general arrangement of the spinning section of the spinning machine; Fig. 4 is a fragmentary perspective view of mechanism at the gearing end of the spinning machine in association with the main control cam of the machine, and later to be described, certain parts being omitted for clearness; Fig. 4a is a vertical sectional view of the ring-spinning machine showing the main control cam and its cooperating mechanisms; Fig. 5 is a diagrammatic view of a time chart of the main control cam for controlling the operation of the spinning machine; Fig. 5a is a plan of the working face of the main control cam; Fig. 5b is a cross-sectional view of the main control cam; Fig. 6 is a fragmentary elevation of clutch mechanism in association with the main control cam of the spinning machine; Fig. 6a is a fragmentary perspective view of clutch mechanism in association with the main driving shaft for transmitting the drive to the tin-roller of the spinning machine; Fig. 6b is a fragmentary perspective view of the spindle rail clutch mechanism in association with the main control cam; Fig. 7 is a schematic view showing the driving gear mechanism of the spinning machine; Fig. 8 is a fragmentary perspective view of the main control cam and the mechanism for operating the lappets during the doffing operation of the spinning machine, the cam being shown broken to expose a cam track later referred to; Fig. 9 is a fragmentary perspective view, drawn to a larger scale, of spindle-rail screw clutch driving mechanism, later to be described; Fig. 10 is a fragmentary perspective view, drawn to a larger scale, of the front roller driving clutch, later to be described; Fig. 11 is a fragmentary perspective view, also drawn to a larger scale, of gripper mechanism for doffing a full cop from a spindle and replenishing the spindle with a fresh cop tube, and later to be described; Fig. 12 is a fragmentary side view of the spinning machine showing a ring plate and mechanism for replenishing tubes, other parts being omitted for clearness of illustration; Figs. 13 to 21 inclusive are fragmentary diagrammatic views of a spindle and some co-operating parts depicting a complete cycle of operations of the spinning machine.

Reference will first be made to Figs. 1, 2 and 3 of the drawings which show the machine in general arrangement.

10 indicates the frame of the machine which is of usual construction including end frames, stretchers and spring pieces; 11 indicates the spindle rails, which are tied across the frame by tie pieces, one of which is shown at 12 in Fig. 3; 13 indicates the spindles, 14 the tin roller driven from the main driving shaft 15 which receives its motion from an electromotor, not shown, but advantageously situated at the gearing end of the machine; 16 indicates the tapes by which the spindles 13 are driven from the tin roller 14; 17 indicates the ring plates, 18 the rings; 19 the separators; 20 the lappets; 21 the bottom front delivery rollers and 22 the roller stands.

The tin roller 14 is driven from the main driving shaft 15 by chain and sprocket gearing, a sprocket wheel 23 fast on the shaft 15 being wrapped by a chain 24 which also wraps a sprocket wheel 25 fast on the shaft 26 of the tin roller 14.

The spindles are driven in groups by means of endless driving bands or tapes. As shown in Fig. 3, the endless tape 16 wraps the tin roller 14 and passes over a tension pulley 27 mounted on a shaft 28 common to all the spindles and mounted at opposite ends in the end frames of the machine. The pulley 27 is carried by a weighted swing lever 29 pivotally mounted on the shaft 28 and adapted to hold the pulley 27 against the tape 16 to maintain constant tension on said tape throughout the cycle of operations of the machine. The tape 16 then passes under a jockey pulley 30 mounted on a bracket 31 carried by a shaft 32, common to all the spindles on that side of the machine, and, secured in brackets forming part of the tie piece 12 connecting the spindle rails 11, thence around the whorls of two adjacent spindles 13, across the machine, around the whorls of the opposite pair of spindles, over a further jockey pulley 33 mounted in similar manner to the jockey pulley 30 and back to the tin roller 14.

The remaining spindles are driven in quartets in similar manner.

Each spindle rail 11 on opposite sides of the machine is connected by tie-rods, the said tie-rods being mounted at opposite ends, and, if desired, intermediately of said ends, on screw-threaded rods, one of which is shown at 34 in Fig. 3, rotatably carried in bearings on the frame 10 of the machine. Assuming the spindle rails to be at the top position for commencement of spinning, the screw-threaded rods 34 on one side of the machine are each simultaneously rotated through a worm wheel 35 on the lower end of the said rod enmeshed with a worm 36 fast on a shaft 37 mounted in bearings secured to the frame of the machine, see Fig. 7, the shaft 37 extending the full length of the machine.

The screw-threaded rods 34ª on the opposite side of the machine are also simultaneously rotated with the rods 34 by worm wheels 35ª on said rods and worms 36 on a shaft 37ª.

The shafts 37 and 37ª are geared together by gear wheels 38 and 39. The shafts 37 and 37ª are driven from the main driving shaft 15.

A gear wheel 40 fast on the main driving shaft 15 is enmeshed with a gear wheel 41 fast on a countershaft 42 mounted in parallelism with the shaft 15 in bearings on the frame 10. Fast on the shaft 42 is a gear wheel 43 enmeshed with the adjacent gear wheel 44 of a pair of carrier gear wheels, the other wheel 45 of which is enmeshed with a gear wheel 46 fast on a further countershaft 47 also mounted, in parallelism with the shaft 15, in bearings on the frame 10.

Fast on the shaft 47 is a gear wheel 48 enmeshed with a gear wheel 49 fast on a further countershaft 50 mounted in bearings in parallelism with, and below, the shaft 47. A worm 51 fast on the shaft 50 is entrained with a worm-wheel 52 fast on a cross-shaft 53 mounted at opposite ends in bearings in the frame 10. A further worm 54 fast on the shaft 53 is entrained with a worm wheel 55 freely mounted on a shaft 56 mounted in parallelism with the shaft 50.

The worm wheel 55 is adapted to be clutched to the shaft 56 by means of a clutch 57 in operative association through a lever system with a main control cam 58 carried by the frame 10 above the main driving shaft 15.

Fast on the shaft 56 is a gear wheel 59 entrained with a change wheel 60 in turn entrained with a further wheel 61 which is in mesh with the gear wheel 39.

This drive is for spinning and forms a reduction gear by which the high speed of the main drive shaft 15 is reduced to give a very slow turning movement to the shafts 37 and 37ª imparting downward movement to the spindle rails.

The drive to the front delivery rollers 21 is taken from the countershaft 42 through a gear wheel 62 freely mounted on said shaft and adapted to be clutched thereto by means of a clutch 63, see Figs. 1, 2 and 7, in operative association with the main cam. The gear wheel 62 transmits turning movement to a gear wheel 64 fast on the front bottom roller 21 by way of a train of gear wheels 65. The front bottom roller on the opposite side of the machine is rotated simuletaneously but in opposite direction by means of a chain 66 wrapping a chain wheel 67 fast on the roller 21 on one side of the machine and a further chain wheel 68 on the opposite side of the machine mounted on a stud carrying a gear 69 entrained with a gear wheel 70 fast on the adjacent front roller 21.

The ring plates 17 are reciprocated vertically between predetermined limits which do not change in the build-up of the cops.

Each ring plate 17 is mounted for vertical movement on pokers 71, Figs. 3 and 12, each furnished at its lower end with a bowl plate 72 adapted to rest on a bowl 73 mounted at one end of a swing lever 74 pivoted at 75 in the machine frame. A steel tape 76 is connected at one end to a fulcrum stud 77 on the lever 74 and, passing over a guide pulley 78 is secured by its other end to a horizontal draw bar 79. The draw bar 79 is supported in rolling contact with the guide pulley 78. The draw bars 79 on opposite sides of the machines are connected together at the gearing end of the machine by a tie-bracket 80, see Fig. 4. A chain 81 is connected by one end at midposition to the tie bracket 80 and, passing under a guide pulley 82, is fastened at its opposite end to one end of a lever 83 pivoted at 84 in the machine frame, and furnished at midposition with a bowl 85 tracking a cam 86 fast to a shaft 87 carrying a gear wheel entrained with a gear wheel 88 on the cross shaft 53, see Fig. 2. The pulley 82 is rotatably mounted in one arm 89ª of a bell-crank lever 89 pivoted at 89ᵇ, the other arm 89ᶜ being connected by a link 90 to one end of a further lever 91 pivoted at 92 in the frame 10, and carrying at its opposite end a bowl 91ª tracking a cam surface in the main control cam 58. The turning of the cam 86 rocks the lever 83 to pull the chain 81 around the pulley 82 thereby pulling the draw-bar 79 towards the gearing end of the machine. This movement of the draw-bar 79 exerts a pull on the tape 76 to rock the lever 74 thereby lifting the poker 71 and the ring plate 17.

The lowering of the ring plate is effected by gravity, assisted if need be by added weight, reversing the action of the lifting mechanism previously described, such lowering movement being controlled by the "fall" on the cam 86.

The spinning operation is now in full swing, see Fig. 13.

During the whole cycle of operations of the spinning machine the shafts 15, 42, 47, 50 and 53, see Figs. 2 and 7, are continually running.

Referring now to Fig. 6, when the cop is approaching completion, see Fig. 14, the spindle rail 11 in its slow downward movement meets and depresses the longer arm 93ª of a bell-crank lever 93 pivoted at 94 in a bracket 95 carried on the machine frame 10. The shorter arm 93ᵇ of the lever 93 is formed with a slot 93ᶜ engageable by a pin 96 in the lower end of a long lever 97, hereinafter referred to as the clutch-operating lever, pivoted at 98 in the frame 10. The lever 97 is connected at 99 to one element of a clutch 100 keyed to and slidable on the shaft 50. The other element of the clutch 100 is freely mounted on the shaft 50 and is furnished with a worm 101 entrained with a worm-wheel 102 fast on a vertical shaft 103 journalled in bearings in the frame 10. A gear wheel 104 fast on the upper end of the shaft 103 is enmeshed with a gear wheel 105 freely mounted on a stub-shaft 106 secured to the frame 10, the gear wheel 105 being attached to the main control cam 58. The lever 97 is formed at its upper end with a slot 97ª engageable by a pin 107 in one arm 108ª of a two-armed lever 108 pivoted at 109 in a bracket 110 carried on the frame 10, the other arm 108ᵇ of said lever carrying a bowl 111 lying in the path of movement of a stop 112 on the cam plate 58. A spring 113 secured at one end to the lever 97 and at the opposite end to the frame 10 serves to impart a quick movement to the lever 97 in its operation, the spring 113 acting in toggle fashion.

The pressure of the spindle rail on the lever arm 93ª slowly depresses the lever 93 until the lever 97 is moved past dead-centre when the spring 113 acts to quickly move the lever 97 whereby the clutch 100 is put into operative position to rotate the worm 101 and worm-wheel 102 and, in turn, the gear wheels 104, 105 and the main cam plate 58 whereby to start the doffing cycle. When the doffing cycle is approaching completion the stop 112 contacts the bowl 111 and slowly moves the lever 108 to reverse the movement of the lever 97 until the lever 97 passes dead-centre when the spring 113 quickly returns the lever 97, and thereby the lever 93, to initial position and in doing so takes the clutch 100 out and cuts out the drive to the main cam plate 58 to complete the doffing cycle.

The downward movement of the spindle rails 11 is arrested by taking out the clutch 57 by means of a lever system 57ª operated from the main control cam 58 through a bowl 57ᵇ tracking a cam track 114, see Fig. 6b and also the timing chart shown in Fig. 5, thus stopping the drive from shaft 56 through the gear wheels 59, 60, 61, 39, 38 and the shafts 37, 37ª, worms and worm wheels 36, 36ª, 35, 35ª, and thereby stopping rotation of the screwed rods 34 and 34ª, see Fig. 7, and arresting the movement of the spindle rails 11. As shown in Fig. 6b the lever system 57ª comprises a yoke 57ᶜ embracing at one end one member of the clutch 57, the opposite end being pivoted at 57ᵈ in the frame 10 and there formed with a bifurcated extension 57ᵉ in which is pivoted a link 57ᶠ connected at its opposite end to a lever 57ᵍ pivoted at 57ʰ in the frame 10 and compounded with a lever 57ⁱ in the free end of which is mounted the bowl 57ᵇ.

At the commencement of the doffing cycle the downward movement of the ring plates 17 is extended and rapid upward movement of the spindle rails 11 is simultaneously brought about, the purpose being, first, to put a binding coil of thread around the completed cop and, secondly, to enable a few turns of thread to be wound on to the base of the spindle blade, see Fig. 15, to facilitate doffing and to ensure continuity of spinning.

The spindle rails 11 are raised in the following manner and as illustrated in Figs. 1, 2, 5, 7, and 9.

A bowl 115 mounted in one arm of a bell-crank lever 116 pivoted at 117 in the machine frame tracks a cam surface 118 on the main cam 58. The other end of the lever 116 is pivotally connected at 119 to a clutch lever 120 pivoted at 121 in the machine frame. The clutch lever 120 is operatively connected to one element 122 keyed to and slidable on the shaft 42.

Located at opposite sides of the clutch element 122 is a pair of sprocket wheels 123 and 124. The wheel 123 is furnished with a clutch element 125 and the wheel 124 with a clutch element 126 of opposite hand.

The sprocket wheel 123 is wrapped by a chain 127 which also wraps a sprocket wheel 128 on the shaft 37 and, with the clutch element 122 engaging the clutch 125, the shaft 42 being constantly turned, the drive to the screwed rods is conveyed through the chain 127 to the sprocket 128 on the shaft 37 and simultaneously through the gear wheels 38, 39 to the shaft 37ª whereby the screwed rods 34 and 34ª are turned relatively quickly to raise the spindle rails 11.

When the spindle rails 11 reach ultimate top position governed by the cam track 118 of the main cam plate 58 the element 122 is declutched from the element 125 thereby stopping the drive to the spindle rails.

The extended downward movement of the ring plates is effected in the following manner and as illustrated in Figs. 4 and 5.

The bowl 91ª at one extremity of the lever 91, previously referred to, tracks a cam surface 129 on the main cam plate 58 and controls the movement of the bell-crank lever 89 carrying the pulley 82 around which passes the chain 81 connected to the draw-bars 79 controlling the movement of the ring plates 17, as previously described.

To facilitate the extended downward movement of the ring plates 17, previously mentioned, the lever 91 rocks about its pivot 92 and allows the link 90 to drop thereby rocking the bell-crank lever 89 about its pivot 89ᵇ and swinging the pulley 82 back to slacken the chain 81 thereby giving free movement to the draw bars 79 and permitting the ring plates 17 to fall by gravity.

The extent of the downward movement of the ring plates 17 is governed by adjustable stops mounted on the frame 10 in the path of movement of the draw bars 79. One of said stops is illustrated at 130 in Fig. 4.

The spindle rails 11 are now at their ultimate top position, the ring plates 17 at their lowest position, and the turns of thread are wound around the spindle blades 13.

Immediately prior to the spindle rails 11 reaching the top position the drive to the tin roller 14 is taken out by means of a lever system 14ª operated through a bowl 14ᵇ tracking a cam track 131 in the main control cam 58, as may be seen by reference to Fig. 6a, and also to the timing chart shown in Fig. 5, which takes out a clutch 132 on the main driving shaft 15 connected to the sprocket wheel 23, whereby the sprocket 23 runs idly on the shaft 15, the chain 24 and the sprocket wheel 25 on the tin roller shaft 26 ceasing to transmit turning movement to the tin roller shaft 26 and the tin roller 14, which, however, continues to turn under its own momentum thereby keeping the spindles turning with a gradually decreasing velocity, the spindles now having reached their ultimate top position; the front delivery rollers continuing to deliver material to the spindles whereby a few turns of material are wound on to the blade of the spindle below the full cop, see Fig. 15.

The revolution of the spindles is now brought to a complete standstill by operation of a brake operated from the main cam plate 58.

The brake mechanism is illustrated at Fig. 4, in which 133 indicates a brake drum fast on the tin roller shaft 26 furnished with two brake shoes 134 and 135, each pivoted at its lower end to the frame 10. The brake shoe 134 is connected at 134ª to one end of a link 136 connected at its opposite end to one point 137ª of a three-point fulcrum bracket 137. The brake shoe 135 is connected to a second point 137ᵇ of the fulcrum bracket 137. Suspended at 137ᶜ to the fulcrum bracket 137 is a weight 138, the lower end of which is connected to a pivoted lever 139 pivoted at its proximal end in the frame 10. The lever 139 is connected at 139ª to the lower end of a link 140, which is connected at its opposite end to a lever 140ª, pivoted at 140ᵇ in the frame 10 and furnished at its free end with a bowl 140ᶜ tracking the outer surface of the main control cam and in the path of movement of a projection 141 on said cam, see Fig. 4, Fig. 5a and Fig. 5.

The brake is brought into operation when the lever 140 is depressed by the projection 141 which swings the lever 139 downwards to allow the weight 138 to drop thereby causing the bracket 137 to act toggle-wise and draw the brake shoes 134 and 135 to close on the brake drum 133 and thereby stop the tin roller 14 and the spindles 13.

Simultaneously with this braking action the front delivery rollers 21 are stopped by taking out the clutch 63, see Fig. 10. The clutch 63 is operated through the medium of a bowl 142 tracking a cam track 143 in the main cam 58, the bowl 142 being mounted in one arm of a bell-crank lever 144 pivoted at 145 in the machine frame 10. The other end of the lever 144 is pivotally connected at 146 to a clutch-lever 147 pivoted at 148 in the machine frame 10.

The clutch lever 147 is operatively connected at 147a to one element of the clutch 63 keyed to and slidable on the shaft 42.

When the clutch 63 is out the wheel 62, which is the first of a train of gear wheels 65, stops and thereby stops the gears 65, 64 and the front delivery rollers 21.

The brake is now released by the projection 141 meeting and depressing the bowl 140c and reversing the movements of the brake mechanism levers whereby the weight 138 is lifted releasing the brake shoes 134 and 135.

The lappets 20 are now moved to one side by means of the mechanism illustrated in Figs. 3 and 8. The lappets 20 are mounted on bars 149 slidably mounted on opposite sides of the frame 10 in brackets secured to the frame 10, one of said brackets being illustrated at 150 in Fig. 3.

As illustrated in Fig. 8 the slide bars 149 are connected to each other at the gearing end of the frame by means of a tie-rod 151 furnished at the mid-position with a bracket 152 fast on said tie-rod and connected at its distal end to one arm of a bell-crank lever 153 pivoted at 153a to the frame 10. The other arm of the lever 153 is pivotally connected at 154 to one end of a link 155 the opposite end of which is connected by a universal joint 156 to the upper arm of a bell-crank lever 157 pivoted at 158 in the machine frame 10. The lower arm of the bell-crank lever 157 is furnished with a bowl 157a tracking a cam track 159 in the main cam 58, as may be seen by reference to Fig. 8, and also to the timing chart shown in Fig. 5. When the said bowl is pressed down by the cam track 159 the lever 157 is rocked pulling link 155 to rock lever 153 which pulls on the bracket 152 and thereby draws the slide-bars 149 towards the gearing end of the machine frame so displacing the lappets 20 to one side of the respective spindles and moving the material out of the path of movement of gripper mechanism now to be brought into operation, see Fig. 16.

The gripper mechanism is illustrated in Figs. 4 and 11.

For convenience in the following description reference will only be made to a single gripper, but it is to be understood that all the grippers in the machine are constructed and operated alike.

A gripper proper is illustrated in Fig. 11, in which 160 indicates a tube of rectangular cross-section. There is a tube for each oppositely disposed pair of spindles mounted on the machine frame 10 with the respective ends of the tube behind and in line with said spindles.

The tube 160 is formed in its upper face with a slot 161a extending from the centre towards one end of the tube, a similar slot 161b being formed in the opposite lower face and extending to the opposite end of the tube. Slidably mounted in each end of the tube 160 is a block 162 having extending arms 163 and 164. Pivoted at the end of said arms is a pair of bars 165, 166 normally urged towards each other by a spring 167. The bars 165 and 166 are each so shaped at their free ends and furnished with rubber blocks 168 and 169 as to provide jaws adapted to partially circumscribe the diameter of a full spun cop. The bars 165 and 166 are respectively furnished intermediate of the jaws and the spring 167 with blocks 170 and 171 so shaped in their adjacent faces as to provide further jaws adapted to grip an empty cop tube.

The tube 160 is furnished adjacent to its open end with a cam block 172 secured to the floor of the tube, there being a similar cam block at the opposite end.

One block 162 is formed with a hole 173 penetrating vertically therethrough adapted to be engaged by a pin 174a projecting from a bar 175a and passing through the slot 161a into the block 162. The bar 175a on one side of the machine is mounted above the tube 160 and the pin 174a projects vertically downwards from said bar through the slot 161a into the one block 162. The bar 175b on the opposite side of the machine is mounted below the tube 160 and the pin 174b projects vertically upwards from said bar through the slot 161b into the other block 162. Each bar 175a and 175b is common to a group of grippers.

There are a number of bars 175a and 175b arranged in alignment across the width of the machine. Each bar 175a and 175b has secured to it at opposite ends toothed racks 176a and 176b respectively, the racks 176a and 176b projecting in opposite directions and being mounted in reverse order, i. e., with their teeth on adjacent faces. Fig. 11 illustrates adjacent bar ends and racks.

A gear wheel 177 freely mounted on a stub 178 projecting from the side of the tube 160 is enmeshed with the teeth of the upper and lower racks 176a and 176b, see Fig. 11, the gear wheel 177 being entrained with a gear wheel 179 fast on shaft 180 extending the whole length of the machine and supported in bearings from the frame 10.

At the end of the shaft 180 nearest to the gearing end of the machine there is provided a gear wheel 181 fast thereto, said gear wheel being entrained with the teeth of a rack 182 pivoted at one end in the longer arm of a bell-crank lever 183 pivoted in the frame 10, the shorter arm of the lever 183 being pivotally connected to one end of a swing lever 184 pivoted in the frame 10 and furnished at its opposite end with a bowl 184a tracking a cam surface 185 in the main cam 58. See Figs. 4, 4a, 5, 5a, and 5b.

In the initial stage of doffing the lever 184 is rocked by the bowl tracking the cam surface 185 to depress the shorter arm of the bell-crank lever 183 thereby pushing the rack 182 to revolve the gear wheel 181 and shaft 180 in clockwise direction and turning the gear wheel 179 in the same direction. The gear wheel 179 turns the gear wheel 177 in clockwise direction which in turn pushes the respective upper and lower racks 176a and 176b in opposite directions towards the spindles on opposite sides of the machine thereby moving the respective bars with a parallel motion in the same direction. The bars 175a and 175b being in operative association by the pins 174a and 174b with the slide blocks 162 urge said blocks in opposite directions inside the tube 160 to push the gripper arms outwards. In their outward movement the blocks 170 and 171 on the respective gripper arms 165 and 166 engage the respective cam blocks 172 and the gripper jaws 168 and 169 are opened to embrace a full cop whereupon the arms 165 and 166 lose their abutment on the cam block 172 and the spring 167 forces the jaws to grip the full cop, see Fig. 16.

At this stage the spindles 13 are slowly revolved in reverse direction to that of spinning and at the same time are lowered in order to break the frictional grip of the tube on the spindle blade, and to bring the spindle blade clear of the full cop, see Fig. 17.

This action is a mechanical equivalent of the manual doffing motion employed by an operative in which the full cop is firmly gripped, then given a slight turning or twisting movement and then an upward pull to remove it from the spindle.

The grippers now resume their outward movement carrying with them the full cops until the ultimate outward position is reached as controlled by the cam track 185, and as shown in dot-and-dash lines in Fig. 18. The new tubes are now inserted between the blocks 170 and 171 in manner later to be described whereupon the jaws 168 and 169 are opened to release their grip on the cop which falls in front of the line of spindles, see Fig. 18, on to a conveyor or other receptacle.

The direction of rotation of the gear wheel 179 is now reversed from the cam track 185 and the tube in the gripper blocks 170 and 171 is brought into position in line above the spindle as shown in Fig. 19, and the movement of the gripper mechanism is stopped. The spindles are now lifted to engage in the respective tubes and at the same time rotated in the same direction as for spinning whereby the extra length of material between the ring traveller and the base of the spindle blade is wound on to the lower part of the spindle. The new tube is now in position on the spindle, see Fig. 20.

The reverse movement of the grippers is now resumed and the gripper blocks 170 and 171 are forced apart, by the resistance of the cop tube on the spindle, to release said tube and the grippers are eventually retracted to initial position within the gripper tube, the motion being controlled by the cam track 185.

The lowering of the spindles is effected by mechanism shown in Figs. 1, 2, 5, 7, and 9.

The sprocket wheel 124 is wrapped by a chain 186 which also wraps a sprocket 187 fixed on the shaft 37ᵃ. The clutch element 122 is declutched from the clutch element 125 and clutched to the clutch element 126 fast on the sprocket wheel 124 on the shaft 42, the action of the cam track 118 operating levers 116 and 120, see Fig. 9 as previously described.

The shaft 42 is constantly rotating, the drive being transferred from the sprocket wheel 124 by means of the chain 186 to the sprocket 187 and thereby driving the shaft 37ᵃ and simultaneously through the gear wheels 39 and 38 to the shaft 37 whereby the screwed rods 34 and 34ᵃ are turned relatively quickly to lower the spindle rails 11. When the spindle rails 11 reach ultimate bottom position governed by the cam track 118 of the main cam plate 58, the clutch element 122 is declutched from the clutch element 126 thereby stopping the drive to the spindle rails.

At the stage of operations shown in Fig. 16 the spindles 13 are slowly revolved as they are being lowered, to break the frictional grip of the full cop on the spindle blade and also to allow for the extra length of spinning material previously wound on the basal part of the spindle blade to unwind sufficiently to avoid possibility of breakage during the downward movement of the spindle.

This operation, for convenience referred to as an "inching" motion, is brought about by mechanism illustrated in Fig. 4 in which 188 indicates a disc fast on the tin roller shaft 26. Fast on a stub shaft 189 mounted in the frame 10 adjacent to the disc 188 is a quadrant 190 furnished on its periphery with a spring-influenced shoe 191 having a frictional surface adapted to be in contact with the face of the disc 188.

Fast on the stub shaft 189 is a link 192 the distal end of which is connected by a further link 193 to one arm of a bell-crank lever 194 pivoted in the frame 10, the other arm of the lever 194 being connected to a rod 195 pivotally connected at its opposite end to the lever 196 pivoted at one end in the frame 10 and furnished at its opposite end with a bowl 196ᵃ, tracking a cam track 197 in the main cam 58, see Fig. 4a.

When the bowl on the lever 196 rises in the cam track 197 the lever 196 lifts the rod 195 to rock the bell-crank lever 194 and, through the links 193 and 192, turns the stub shaft 189 which rocks the quadrant 190, whereby the shoe 191 is caused to frictionally engage the disc 188 and turn it, thereby turning the tin roller 14 in the direction indicated by the arrow X, that is, in the opposite direction to spinning, which permits the spun material on the base of the spindle blade to unwind. This operation occurs in timed sequence only when the spindles are being lowered to withdraw them from the full cops, see Fig. 17.

When the spindles are raised to enter the fresh tubes the foregoing movements are reversed to rewind the aforesaid spun material.

The quadrant 190 is used when the machine is spinning weft. When the machine is spinning warp the spindles are revolved in the opposite direction therefore provision has to be made to turn the tin roller 14 in opposite direction to that previously described in the inching motion. This is effected by sliding the quadrant 190 out of its operative position so that the shoe 191 is free of the disc 188 and at the same time a similar quadrant 198 and complementary shoe 199 is brought into position to engage the disc 188 on the opposite side of the tin roller shaft 26.

When the bowl 196ᵃ on the lever 196 is operated by the cam track 197 the tin roller 14 is turned in a direction opposite to that indicated by the arrow X when the spindles are being lowered.

In a previous description relating to Fig. 18 it was stated that, in a certain point in the cycle of operations fresh tubes were inserted into the gripping mechanism and description will now be given of the means by which the fresh tubes are so inserted.

In the following description reference will be made to Fig. 4 and Fig. 12 and for convenience only the tube replenishing mechanism on one side of the machine will be described, but it is to be understood that the tube replenishing mechanism on the opposite side of the machine is similar in construction and operated simultaneously.

Mounted on the frame 10 below and in advance of the line of spindles 13 and spindle rail 11 is a light metal bar 200 of inverted channel section furnished on its upper face with a multiplicity of nipples 201 adapted to receive the cop tubes indicated at T, the nipples 201 being spaced apart in line with the spindles 13, see Figs. 12, 17 and 18. The bar 200 is advantageously guided in its vertical up-and-down movement in guides located at opposite ends of the machine.

The bar 200 is mounted for vertical parallel movement at the extremities of a multiplicity of levers, two of which are shown at 202 and 203 in Fig. 12, but for convenience in description reference will only be made to the lever 202 it being understood that the remaining levers are operated similarly.

The lever 202 is pivoted at 204 in the bar 200 and at 205 in a block 206 slidable on a rod 207 secured in brackets 208 mounted on the frame 10. A lever 209 is pivoted at 210 in the bracket 208 and is connected at 211 to the lever 202 at a position intermediate of the pivots 204 and 205, the connection 211 providing a pivot for the lever 202.

A draw rod 212 is mounted slidably in extensions 208ª of the brackets 208. The block 206 is fast to the draw rod 212.

The draw rod 212 is furnished at the gearing end of the machine with a block 213 which is connected to a toothed rack 214 slidably mounted in the frame 10, see Fig. 4a. Referring to Figs. 1, 4 and 4a a cross-shaft 215 mounted in bearing brackets 216 on opposite sides of the frame 10 is furnished at opposite ends with two gear wheels 217 respectively entrained with the racks 214. The shaft 215 is also furnished with a further gear wheel 218 fast on said shaft and enmeshed with the teeth of a quadrant 219 pendent from an overhead shaft 220 pivoted in the frame 10, said quadrant 219 being furnished with an extension 219ª connected by a turn-buckle 219ᵇ to one end of a lever 221 pivoted at 221ª in the frame 10 and furnished at mid-position with a bowl 221ᵇ, tracking a cam track 222 on the main control cam 58.

During the spinning operation of the machine the operator places fresh tubes T on the nipples 201 ready for the next replenishment operation.

The vertical centre line of each pair of gripper blocks 170 and 171 is above and in axial alignment with the vertical centre line of the tube T on the nipple 20 with which the grippers are to engage, see Fig. 12.

Assuming the nipples 201 to be fully loaded, when the bowl on the lever 221 is depressed by the cam track 222 the toothed quadrant 219 is rocked about the pivot 220 and turns the gear wheel 218 and thereby the shaft 215 whereupon the respective gear wheels 217 force the racks 214 towards the gearing end of the machine, thus moving the draw bar 212 in the same direction, whereupon the block 206 being fast to the draw bar 212 is drawn along the rod 207 causing the pivot point 205 to approach the pivot 210 when the levers 202 and 209 operates scissors-wise to raise the bar 200, with the loaded nipples vertically, until the tubes T are inserted between the gripper blocks 170 and 171 of the gripper mechanism. The final upward movement of the bar 200 forces the tubes T between the gripper blocks 170 and 171 and in doing so opens the jaws 168 and 169 to release the grip on the full cop C which falls in front of the line of spindles, see Fig. 18, on to a conveyor or other receptacle.

At this point, and controlled by the cam track 222, the tube replenishing mechanism just described is brought to a momentary standstill and is then returned to initial position leaving the tubes T in the grippers 170 and 172, see Fig. 18, whereupon the grippers are partially retracted to bring the tubes T over and above the line of spindles, see Fig. 19, when the spindle blades are brought up to engage the tubes T, see Fig. 20, and the grippers then return to fully retracted initial position leaving the tubes on the spindles.

The lappets 20 are now returned to initial position, the drive to the ring plates is brought into operation, the front delivery rollers are revolved to start delivery, the spindle drive is brought into operation to revolve the spindles, the drive to the screwed rods 34 is brought into operation to lower the spindle rails 11 slowly, and finally the stop 112 moves the lever 108, whereupon the clutch element 100 is declutched from the worm 101 thereby cutting out the drive to the main cam 58 leaving the cam 58 in position for the next doffing cycle.

The next spinning cycle has now started.

All the before described operations of the spinning machine are controlled from the main control cam plate 58 and it may now be advantageous to describe in detail the displacement of the beforementioned cam tracks embodied in the cam plate.

Description will therefore now be given of the main control cam plate with reference to Fig. 5 which shows a schematic arrangement of the cam tracks on the underside of the cam plate 58 and for convenience of description the operating points are assumed to be along the line A—B, but it is to be understood that in actual practice the individual operating points may be displaced around the cam tracks at various points convenient to the position of individual operating mechanisms.

The plate 58 revolves in the direction indicated by the arrow Y.

Starting from the centre of the cam plate 58 the stop 112 in the first track serves to bring the cam plate to a standstill by operating the bowl 111 on the arm 108ᵇ of lever 108 and takes out the clutch 100, as previously described.

At the beginning of a doffing cycle the cam plate 58 is rotated through the action of the spindle rail 11 which depresses the lever 93 whereby to clutch in the drive to the cam plate, as previously described.

The cam tracks are concentrically arranged around the cam plate but, although the operations of the machine take place in timed sequence in a complete cycle the cam tracks do not operate in chronological order as viewed in Fig. 5a, but do so as viewed in the time chart diagram shown in Fig. 5, the cam tracks being designed to bring the respective mechanisms into operation at varying times governed by the particular operation to be performed.

For convenience in the following description reference will be made to various cam tracks but where the reference character designating a cam track is distinguished by the addition of an exponent letter it is to be understood that this refers to a variation in the contour of the relevant cam track and not to a separate track.

The cam track to come into operation first at point A, B, is the fourth track 114 which controls the clutch mechanism operating the downward movement of the spindle rails 11 when the machine is spinning. The part 114ª takes out the clutch 57 bringing the spindle rail to a halt in its bottom position.

The next cam tracks to come into operation are the seventh track 129ª and eighth track 118ª which operate simultaneously. Cam track 129ª brings the ring rails 17 to bottom position and the cam track 118ª puts in the clutch 122 to bring the spindle rails 11 up quickly to a doffing position.

The next cam track to come into operation is the second track 131ª which takes out the tin roller driving clutch 132.

The next cam track to come into operation is the eighth track 118ᵇ which takes out the clutch 122 bringing the spindle rails 11 to a standstill in a doffing position.

The next cam tracks to come into operation are the third track 141ª and the fifth track 143ª which operate simultaneously, cam track 141ª putting on the tin roller brake 133 to stop the spindles revolving and the cam track 143ª taking out the clutch 63 to stop the revolution of the front delivery rollers 21.

The next cam track to come into operation is the third cam track 141ᵇ which releases the brake 133.

The next cam track to come into operation is the tenth track 159ª to draw the lappets 20 to one side of the respective spindles.

The next cam track to come into operation is the eleventh track 185ª which brings the grippers out to grip a full cop.

The next cam track to come into operation is the eighth track 118ᶜ which controls the clutch 122 to bring the spindle rails 11 down.

The next cam track to come into operation is the sixth track 197ª which brings into operation the inching motion.

The next cam track to come into operation is the eighth track 118ᵈ which operates the clutch 122 to bring the spindle rails 11 to a standstill.

The bowl in the sixth cam track has now reached the point 197ᵇ in said track stopping the inching motion.

The next cam track to come into operation is the eleventh track 185ᵇ which brings the grippers carrying the full cops to maximum outward position.

The next cam track to come into operation is the ninth track 222ª which operates the mechanisms to bring up the fresh cop tubes into the grippers thereby releasing the full cops, and 222ᵇ returning the said mechanism to initial position.

The next cam track to come into operation is the eleventh track 185ᶜ for retracting the grippers to bring the fresh cop tubes over the line of spindles.

The next cam track to come into operation is the eighth track 118ᵉ which puts in the clutch 122 to bring the spindles 13 up into the cop tubes.

The next cam track to come into operation is the sixth track 197ᶜ which puts the inching motion into operation until point 197ᵈ is reached when the inching motion is stopped.

The next cam track to come into operation is the eighth track 118ᶠ which takes out the operating clutch 122 to bring the spindle rails 11 to a standstill.

The next cam tracks to come into operation are the seventh 129ᵇ, tenth 159ᵇ and the eleventh 185ᵈ, track 129ᵇ lifting the ring rails 17 to bottom spinning position, track 185ᵈ drawing the grippers back to initial retracted position, and track 159ᵇ moving the lappets 20 back to initial spinning position.

The next cam tracks to come into operation are the second track 131ᵇ, and the fifth track 143ᵇ, the track 131ᵇ operating the clutch 132 to put in the drive to the tin roller 14 and the spindles 13, and the track 143ᵇ operating the clutch 63 to put in the drive to the front delivery rollers 21.

The next cam track to come into operation is the fourth track 114ᵇ which puts in the clutch 57 to bring the spindle rails 11 down slowly during spinning.

The stop 112 on the first track now takes out the clutch 100 to bring the cam plate 58 to a standstill and the doffing cycle is completed.

A brief resume of the cycle of operations will now be given with reference to Figs. 13 to 21.

Fig. 13 shows the commencement of the spinning operation, the spindle 13 is revolving, the ring plates 17 are traversing vertically up and down to give the required chase of the cop, the spindle 13 is slowly being moved down by descent of the spindle rail to give the build to the cop, the lappet 20 is in spinning position above the spindle 13 and the gripper mechanism is fully retracted within the tube 160.

Fig. 14 shows a cop C completed with the spindle 13 in its bottom spinning position.

Fig. 15 shows the ring plate 17 dropped into its lowest position and stationary while a bunch of spun thread is being wound on to the base of the spindle blade prior to the revolution of the spindle and the roller delivery being stopped.

Fig. 16 shows how the lappet 20 has been moved to take the thread out of the path of movement of the gripper mechanism which has moved forward to grip the full cop C.

Fig. 17 shows the full cop C held in the grippers above the spindle 13 which has moved to its bottom position, the inching motion having taken place. This figure also shows a fresh cop tube T in position for the replenishing operation.

Fig. 18 shows the grippers moved out of the tube 160 to fullest extent with a new cop tube T in the grippers which have released the full cop C, see full lines.

Fig. 19 shows the grippers having brought a fresh cop tube T over and in line with the spindle 13.

Figure 1:
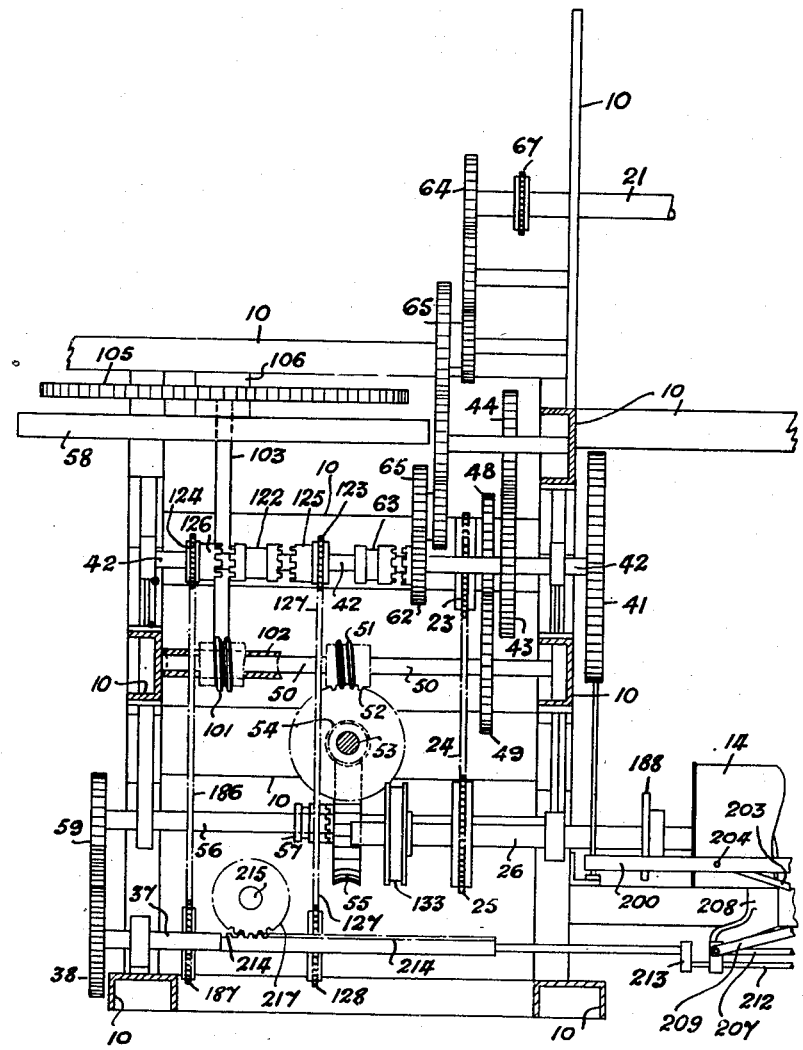
Figure 2:
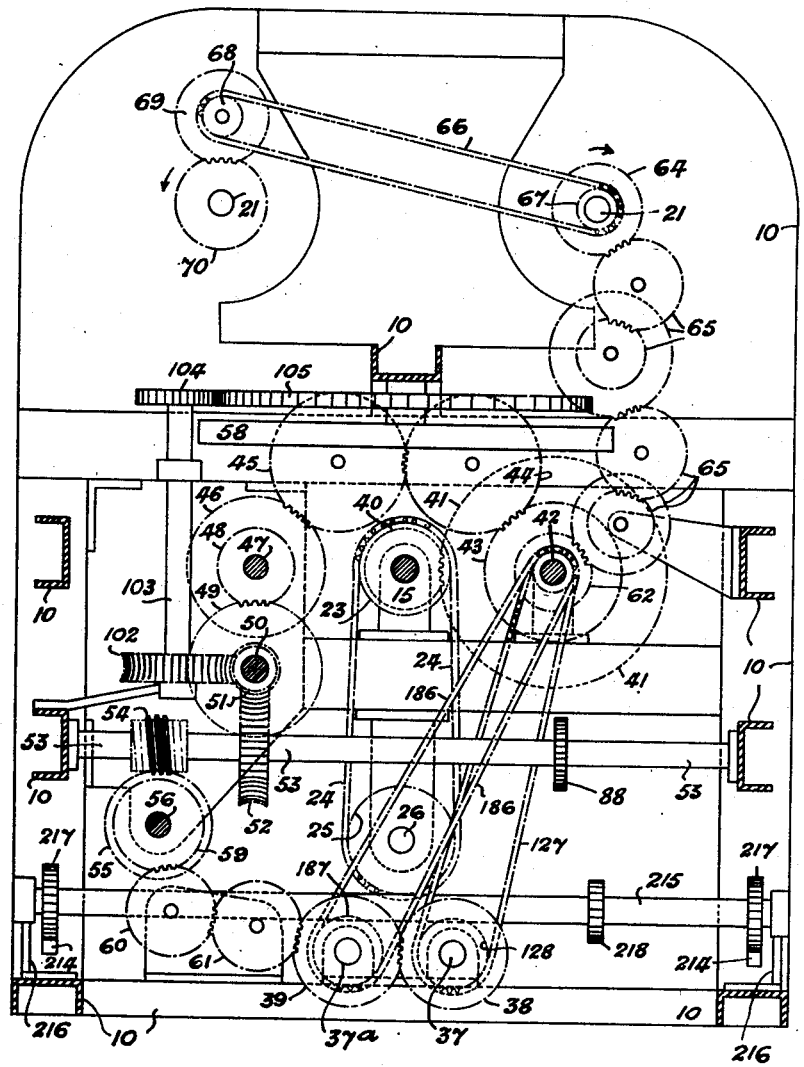
Figure 3:
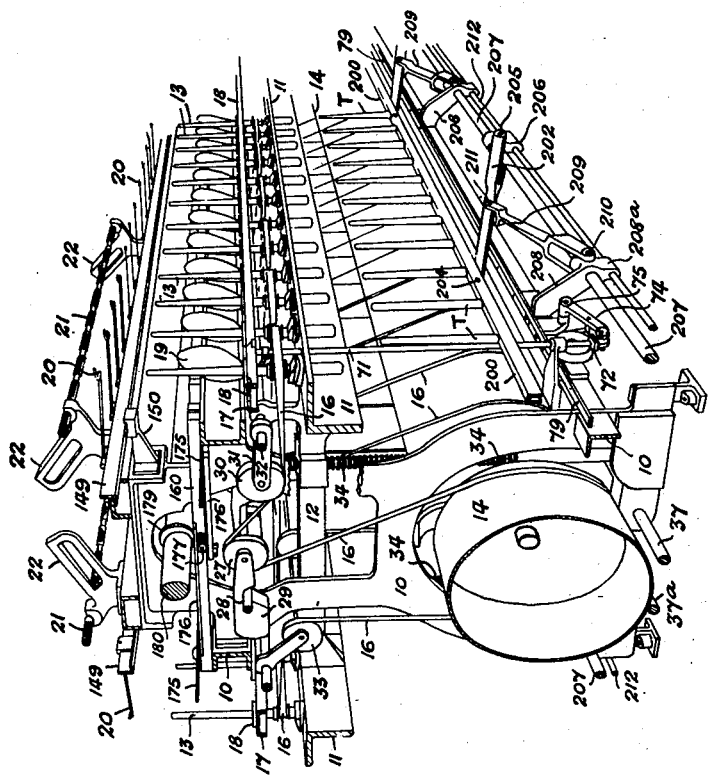
Figure 4:
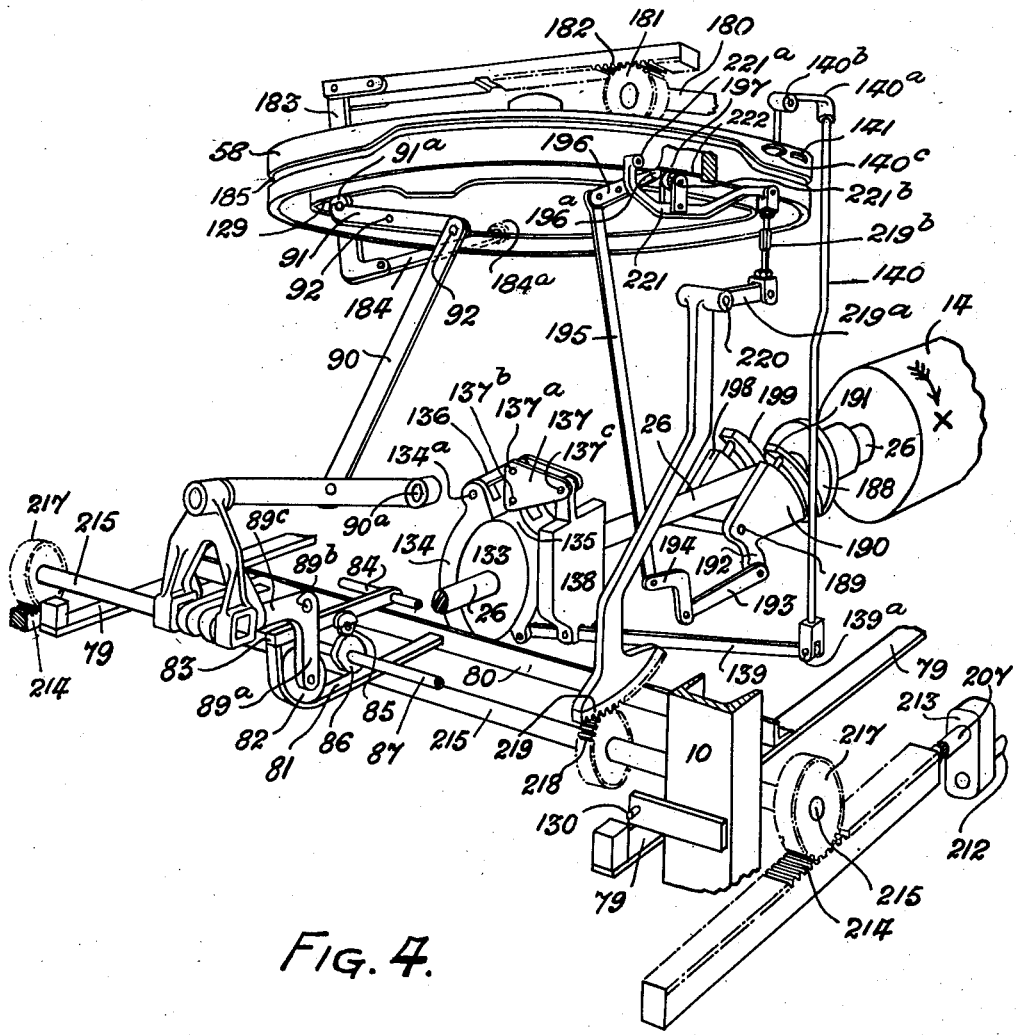
Figure 5:
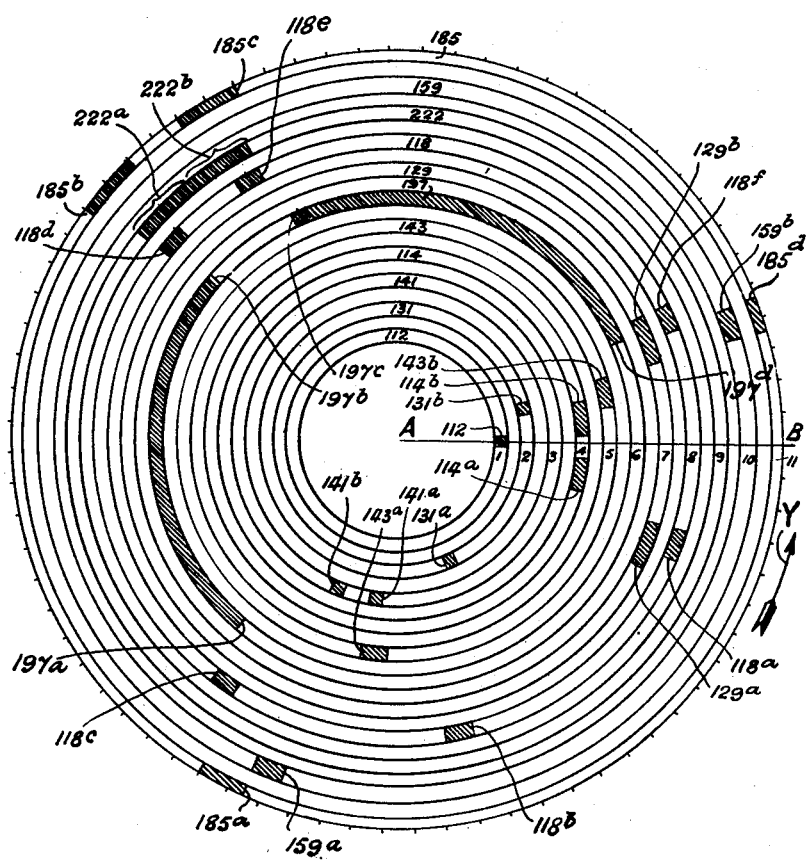
Figure 8:
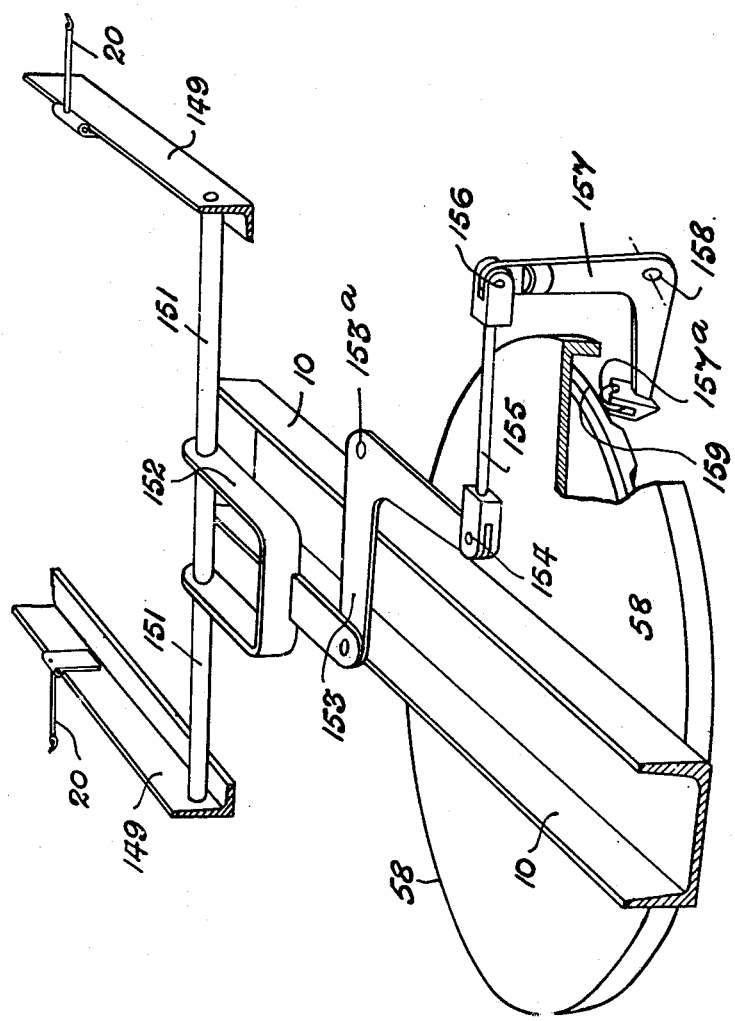
Figure 9:
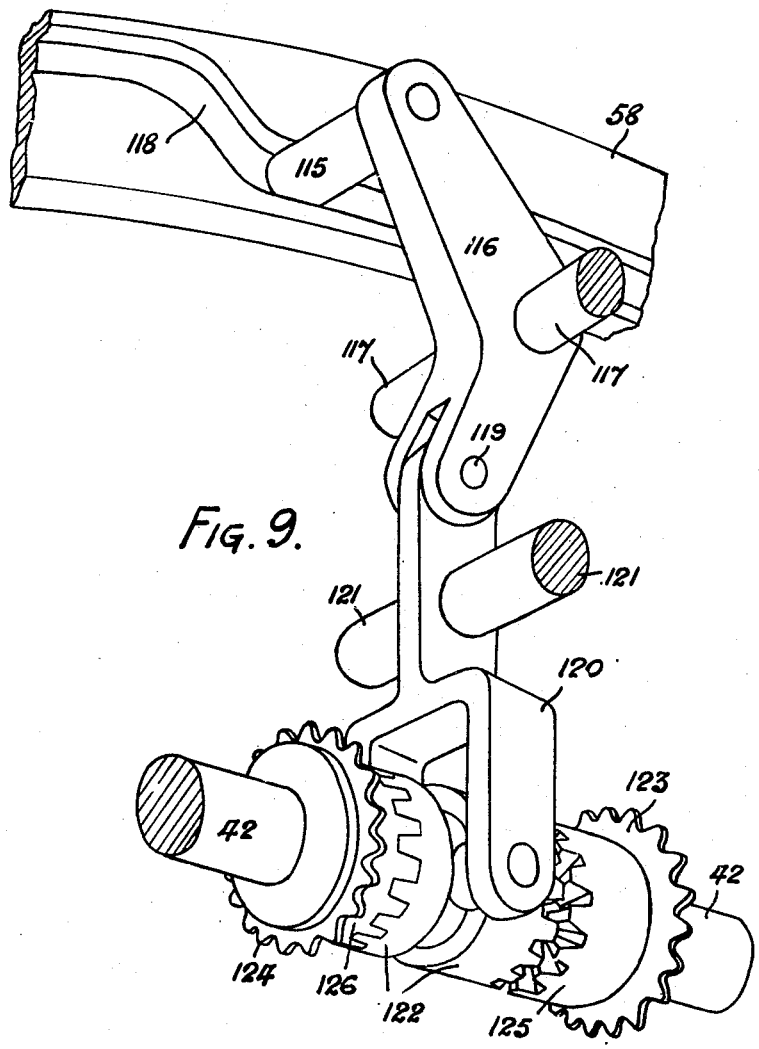
Figure 10:
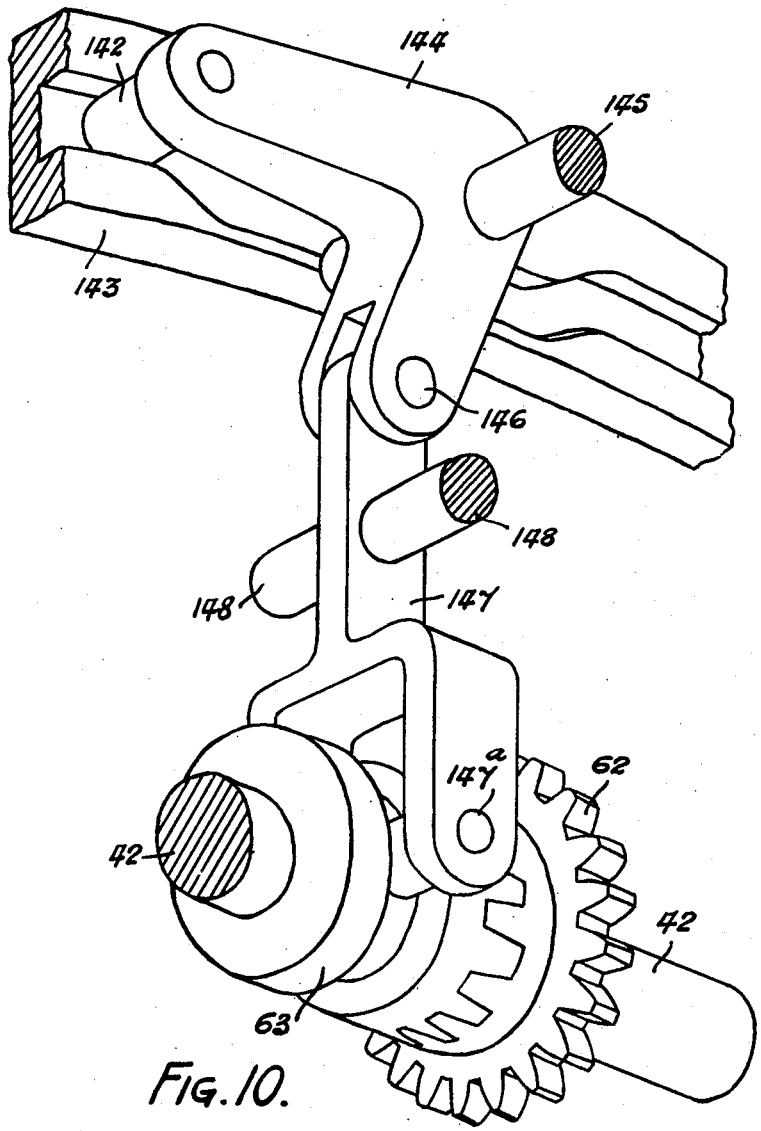

Fig. 20 shows the spindle 13 raised into engagement with the cop tube T, the inching motion having taken place in reverse to that in Fig. 17, prior to the grippers being retracted to initial position in the tube 160, the lappet 20 being brought back over the spindle 13, and the ring plate 17 being lifted to commence its traverse when spinning.

Fig. 21 shows the parts again in position to commence spinning as in Fig. 13.

What is claimed is:

1. A ring spinning machine of the type described incorporating gripper means for automatically removing full cops from the spindles and for replenishing the spindles with fresh tubes, ring plates, a chain controlling the movement of the ring plates, a lever system to slacken or tighten the chain controlling the movement of the ring plates whereby to cause an extra falling movement of the ring plates during the doffing cycle to permit winding of a number of turns of thread onto the spindle blade and then to return the ring plates to normal spinning position, spindle rails mounted on screw-threaded rods, a drive for the rods, a lever system and clutches controlling the drive for the screw-threaded rods on which the spindle rails are mounted whereby the spindle rails are raised and lowered vertically, the spindle rails being caused to make a quick upward movement to a doffing position after completion of the cops, and, while the spindles are still revolving, a slight reverse downward movement of the spindles to effect doffing and a quick return vertical movement to initial position for replenishment of the spindles, now stationary, with fresh tubes and for subsequent restarting of a spinning operation, a lever and sector system in operative association with the spindles whereby the spindles are given a slight turning movement in the reverse direction to spinning simultaneously with the downward movement of the spindle rail and a turning movement in the direction of spinning in the upward movement of the spindle rails for facilitating doffing, delivery draw rollers, a lever system and clutch for stopping the delivery of material from the delivery draw rollers, a tin roller driving shaft, a drive for said shaft, a lever system and braking means for stopping the tin roller driving shaft, a lever system and clutch for taking out the drive to the tin roller shaft, lappets, a lever system and interconnected slide bars for moving the lappets relatively to the spindles, a main control cam for controlling the aforesaid operations of the spinning machine in timed sequence, a drive for said cam, a lever system and clutch in operative association with the spindle rails and cam to bring the main control cam into operation to commence a doffing cycle, and a lever system controlled by said cam to take out the drive to said cam at the end of a doffing cycle.

2. A ring spinning machine as claimed in claim 1, in which the spindle rails are arranged on opposite sides of the machine and are connected by tie rods, the said tie rods being each mounted at opposite ends, and intermediately of said ends on screw-threaded rods rotatably carried in bearings on the machine frame, said screw-threaded rods being rotated by gearing receiving motion through a clutch-coupling, whereby the spindle rails are caused to travel up or down in a vertical direction as required in the working of the spinning machine.

3. A ring spinning machine as claimed in claim 1, in which the spindle rails are arranged on opposite sides of the spinning machine and are tied together at several points along the length of the machine by tie brackets extending across the machine, and in which the screw-threaded rods run through the tie brackets are rotated by means of reversible drives to cause the said spindle rails to rise or fall, the drive to the rods on opposite sides of the machine being through a gear wheel at the lower end of each of the said rods enmeshed with a gear wheel fast on a shaft extending the full length of the machine, the shafts on opposite sides of the machine being geared together by gear wheels whereby each screw-threaded rod is simultaneously rotated, a main driving shaft, the drive to said shafts being through a reduction gear from the main driving shaft of the machine whereby the high speed of the main driving shaft is reduced to give a very slow turning movement during spinning to the first-mentioned shafts imparting downward movement to the spindle rails, the drive being controlled through a clutch operated through a lever system from the main control cam, the downward movement of the spindle rails being arrested by taking out the aforesaid clutch thus stopping the drive to the screw-threaded rods.

4. A ring spinning machine as claimed in claim 1, in which the delivery draw rollers are driven from a countershaft having a gear wheel freely mounted thereon but adapted to be clutched to said shaft by a clutch operated through a lever system controlled from the main control cam, the gear wheel transmitting motion through a gear train to the delivery draw roller on one side of the machine, motion being transmitted to the front delivery roller on the opposite side of the machine through chain and sprocket mechanism and a train of gears.

5. A ring spinning machine as claimed in claim 1, in which when the spinning operation is nearing completion, and at a point in the downward movement of the spindle rails, the rails meet and rock a bell-crank lever which through the medium of a lever clutches in one element of a clutch freely mounted on a shaft, the other element of the clutch being furnished with a worm entrained with a worm wheel fast on a vertical shaft, a gear wheel on said vertical shaft being entrained with a gear wheel attached to the main control cam, the clutch operating lever being engageable at one end with a two-armed pivoted lever furnished with a bowl lying in the path of movement of a stop on the main control cam, a spring connected to the clutch operating lever and to the frame of the machine acting toggle fashion to quickly move the clutch lever when it is moved past dead centre by action of the aforesaid stop whereby to put the clutch into operative association with the worm and through the worm wheels and gear wheels to turn the main cam and initiate a doffing cycle, and when the doffing cycle is approaching completion the aforesaid stop acts to reverse the movement of the lever system to take out the clutch and cut out the drive to the main cam to complete the doffing cycle.

6. A ring spinning machine as claimed in claim 1 in which the spindle rails are rapidly raised at the commencement of a doffing cycle through the medium of a bowl tracking a cam surface on the main control cam whereby to move a lever connected to the operating lever of a clutch element splined to and slidable on the counter shaft, there being a pair of sprocket wheels free on said shaft on opposite sides of said clutch element and each furnished with a clutch element adapted for engagement by the aforesaid slidable clutch element, said sprockets each being wrapped by chains respectively wrapping further sprockets on the shafts carrying the worms for driving the screwed rods for raising and lowering the spindle rails, whereby when one of said sprockets is clutched to the driving shaft the worm shafts which are interconnected by gear wheels are turned to quickly raise the spindle rails, and when the spindle rails reach ultimate top position governed by the cam track of the main control cam said last-mentioned sprocket is declutched thereby stopping the drive to the spindle rails.

7. A ring spinning machine as claimed in claim 6, in which the extended falling movement of the ring plates is effected through a bowl tracking a cam surface on the main cam which control the movement of the bell-crank lever carrying the pulley around which passes the chain connected to the draw-bars controlling the movement of the ring plates, whereby when the bell-crank lever is rocked by a lever system operated by the movement of said bowl the chain is slackened thereby permitting the ring plates to fall by gravity, stops being provided to govern the extent of said downward movement.

8. A ring spinning machine as claimed in claim 1, in which the drive to the tin roller driving the spindles is taken out, prior to the spindle rails reaching the top position, by means of a lever system operated by a cam track on the main cam which takes out a clutch on the main driving shaft connected to a sprocket wheel wrapped by a chain which also wraps a sprocket wheel on the tin roller shaft whereby the first-mentioned sprocket runs idly on its shaft and ceases to transmit movement to the tin roller shaft, the tin roller continuing to turn under its own momentum with a gradually decreasing velocity whereby the spindles which have now reached top position also continue to turn and with the front delivery rollers still delivering material to the spindles a few turns of material are wound on to the blades of the respective spindles.

9. A ring spinning machine as claimed in claim 1, including brake mechanism for bringing the spindles to a complete standstill, said brake mechanism including a brake drum fast on the tin roller driving shaft furnished with two brake shoes each pivoted at its lower end to the frame, the brake shoes being respectively connected at their upper parts to two opposite points of a three-point fulcrum bracket from the third point of which is suspended a weight connected by its lower end to a lever pivoted at one end in the frame and linked at its opposite end to a further pivoted lever furnished at its free end with a bowl tracking a cam track in the main control cam, whereby when the said bowl depresses the last-mentioned lever the linkage to the weight causes the weight to drop whereby the fulcrum bracket acts toggle-wise to draw the brake shoes to close on the brake drum and thereby stop the tin roller and the spindles, the brake being subsequently released by further movement of the bowl tracking the cam track in the main cam and reversing the movements of the brake mechanism whereby the weight is lifted releasing the brake shoes from the brake drum.

10. A ring spinning machine as claimed in claim 1, in which simultaneously with the application of the brake to the tin roller drive the drive to the front delivery rollers is taken out by means of a clutch operated through the medium of a bowl tracking a cam track on the main control cam, said bowl being mounted in one arm of a bell-crank lever pivoted in the frame of the machine, the other end of said lever being connected to a clutch-operating lever also pivoted in the frame and operatively connected to a movable element of a clutch fast on the counter shaft upon which is secured the first gear wheel of a train of gear wheels, the last of which is entrained with a gear wheel on the shaft of the front delivery rollers on one side of the machine, said shaft being in operative association with the shaft of the front delivery rollers on the opposite side of the machine through chain and sprocket mechanism, whereby when the said clutch is taken out the said first gear wheel stops and thereby stops the train of gears and the front delivery rollers.

11. A ring spinning machine as claimed in claim 1, in which the lappets are movable out of normal spinning position to facilitate doffing by means of mechanism controlled by the main control cam, in which the lappets are mounted on bars slidably mounted on opposite sides of the machine, and connected together by a tie-rod furnished at midposition with a bracket fast on said tie-rod and connected to one arm of a bell-crank lever pivoted on the frame and connected by a link having a universal joint to the upper arm of a further bell-crank lever, the lower arm of which is furnished with a bowl tracking a cam track in the main control cam, whereby when the said bowl is pressed down by the cam track the levers are rocked and pulling on the bracket on the tie-rod draw the slide bars towards the gearing end of the machine to displace the lappets to one side of the respective spindles thereby moving the material out of the path of movement of the grippers of the doffing mechanism.

12. A ring spinning machine as claimed in claim 1, including gripper mechanism for doffing full cops from the spindles, in which there is a gripper mechanism for each opposed pair of spindles, each gripper mechanism including a tube of rectangular cross-section mounted on the machine frame with the respective open ends of the tube behind and in line with the said spindles, said tube being formed in its upper face with a slot extending from the centre to one end of the tube and with a similar slot in its lower face extending in the opposite direction, there being located slidably within said tube two blocks each having a hole penetrating vertically therethrough, said blocks also having extending arms projecting in opposite direction to the ends of which are pivoted a pair of bars normally urged towards each other by a spring, the bars being furnished at their free ends with rubber blocks and so shaped as to provide jaws adapted to partially circumscribe a full cop, the bars also being furnished intermediate of the jaws and spring with other two blocks so shaped in their adjacent faces as to provide further jaws adapted to grip an empty cop tube, each rectangular cross-section tube also being furnished adjacent to the respective open ends with cam blocks.

13. A ring spinning machine as claimed in claim 12, comprising means for simultaneously operating all the gripper mechanisms in the machine, including a pair of bars common to a group of grippers, one of said bars being above the tubes and engaging the vertically holed blocks at one side of the centre of the tubes by pins penetrating the holes in said blocks from above, and the bar below the tubes engaging the blocks on the opposite side of the centre by pins penetrating holes in said blocks from below, each of said bars being furnished at opposite ends with toothed racks, the teeth of the top rack projecting downwards and the teeth of the lower rack projecting upwards, said racks being respectively entrained with the teeth of a gear wheel freely mounted on a stub axle projecting from the side of a tube, the racks mounted on tubes on opposite sides of the machine being respectively above and below the axis of the said wheel, said gear wheel being enmeshed with a further gear wheel fast on a shaft extending the length of the machine and furnished at the end nearest to the gearing end of the machine with a further gear wheel entrained with the teeth of a rack pivoted at one end in the longer arm of a bell-crank lever pivoted in the frame, the shorter arm of said lever being pivotally connected to one end of a swing lever pivoted in the frame and furnished with a bowl tracking a cam track in the main control cam, whereby in an early stage of the doffing operation the bowl tracking the main control cam depresses the bell-crank lever, and, through the last-mentioned rack rotates the gear wheels to push the respective upper and lower racks in opposite directions towards the spindles thereby moving the lateral bars with a parallel motion in opposite directions and sliding the blocks along the tubes, so that the gripper arms are forced outwards and the jaws opened by the respective cam blocks until, when the arms lose their abutment on the cam blocks, the jaws yieldingly embrace a full cop, whereupon the spindles are slowly revolved in reverse direction to that of spinning and lowered to break the frictional grip of the tube on the spindle blade and to bring the spindle blade clear of the full cop, after which the grippers resume their outward movement carrying with them the cops until the ultimate position is reached when a new tube is inserted in the grippers and the full cop released.

14. A ring spinning machine as claimed in claim 1, including an inching mechanism for unwinding and re-winding the bunch of material wound on to the spindle blade to compensate for the downward and upward movement of the spindles in the doffing cycle, said mechanism including a friction disc on the tin roller shaft, quadrants mounted on opposite sides of the shaft and each furnished on its periphery with a spring-influenced shoe, one of which is adapted to be brought into frictional engagement with the disc on the one side of the shaft when the machine is spinning weft, and the other one on the opposite side of the disc when the machine is spinning warp, said quadrants being mounted on a stub shaft linked to one arm of a bell-crank lever pivoted in the frame, the other arm of the lever being connected to a rod pivotally connected at its upper end to a pivoted lever furnished with a bowl tracking a cam track on the main control cam, whereby when the bowl is depressed the lever system rocks the quadrant which presses the respective shoe against the disc and turns the tin roller in the opposite direction to spinning to unwind said bunch, and to assist in breaking the frictional grip of the tube on the spindle; when the spindles are subsequently raised the reverse operation takes place and the bunch re-wound on the spindle blade.

15. A ring spinning machine as claimed in claim 1, embodying means for replenishing the spindles with fresh cop tubes, including light metal means arranged for vertical sliding movement in guides on each side of the machine below and in front of the respective spindle rails, and furnished with a multiplicity of upwardly extending nipples to receive the fresh cop tubes, the beams being mounted for vertical parallel movement at the extremities of a multiplicity of levers spaced along each side of the machine and each pivoted at its lower end in a block slidable on a guide rod extending the length of the machine, said lever being furnished with a further lever pivoted midway in the length of the first-mentioned lever and connected at its lower extremity to a fixed bracket on the machine frame carrying the guide rod; there being mounted below each guide rod a draw rod fixed to the sliding blocks and free to slide in the brackets and furnished at the gearing end of the machine with a block connected to a toothed rack slidably mounted in the frame of the machine, the racks respectively meshing with gear wheels at opposite ends of a cross-shaft, a further gear fast on said shaft meshes with a toothed quadrant pendent from a stub shaft pivoted in the frame of the machine and fast with a lever furnished with a bowl tracking a cam track on the main control cam, whereby when the bowl is depressed it rocks the toothed quadrant to turn the cross-shaft and draws the racks towards the gearing end of the machine thereby drawing the slidable blocks towards the fixed brackets and imparting a scissors action to the respective levers causing the first-mentioned levers to raise the beams carrying the cop tubes on the nipples upwards to insert the tubes into the grippers, the reverse action of the cam track on the bowl reversing the aforesaid movements and lowering the tube beams to leave the cop tubes in the grippers, the grippers being then partially retracted to bring the tubes over the spindles, the spindles being raised to engage the tubes, and the grippers then being fully retracted to initial position.

16. A ring spinning machine as claimed in claim 1, characterised in that all operations are controlled from a single main control cam comprised of a plate furnished on its underside with a multiplicity of concentric cam tracks each tracked by the respective bowl on levers forming part of a lever system by which the respective operations of the machine are initiated in timed sequence.

WILLIAM HAROLD WATSON.
STANLEY LEWIS COLE.

References Cited in the file of this patent
UNITED STATES PATENTS

| Number | Name | Date |
|--------|------|------|
| 1,436,955 | Graf | Nov. 28, 1922 |
| 1,622,812 | Schneider | Mar. 29, 1927 |